(12) United States Patent
McFadden et al.

(10) Patent No.: US 10,623,506 B2
(45) Date of Patent: Apr. 14, 2020

(54) LOCAL AND REMOTE SEARCH AND CONFIGURATION SYSTEM

(71) Applicant: Microsoft Technology Licensing, LLC, Redmond, WA (US)

(72) Inventors: Matthew T. McFadden, Seattle, WA (US); Hayley L. Steplyk, Redmond, WA (US); Sirirat Reinikka, Bothell, WA (US); Svetlana A. Borodina, Redmond, WA (US); Scott A. Moody, Bothell, WA (US); Jonathan H. Mollerup, Woodinville, WA (US); Kevin Matthew Dargie, Federal Way, WA (US); Zongyao Mao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 15/700,833

(22) Filed: Sep. 11, 2017

(65) Prior Publication Data

US 2019/0082017 A1 Mar. 14, 2019

(51) Int. Cl.
*H04L 29/08* (2006.01)
*G06F 3/0484* (2013.01)
(Continued)

(52) U.S. Cl.
CPC ............ *H04L 67/16* (2013.01); *H04L 67/306* (2013.01); *H04L 67/34* (2013.01); *G06F 3/0484* (2013.01);
(Continued)

(58) Field of Classification Search
CPC .............. G06F 21/6218; G06Q 30/018; G06Q 10/107; H04N 21/41407; H04N 21/4223; H04L 51/12; H04L 12/14
(Continued)

(56) References Cited

U.S. PATENT DOCUMENTS 7,778,926 B1* 8/2010 Grinchenko ......... G06Q 30/018
705/50
8,065,376 B2 11/2011 Smith et al.
(Continued)

FOREIGN PATENT DOCUMENTS

CN 101800953 A 8/2010
CN 102104843 A 6/2011
(Continued)

OTHER PUBLICATIONS

"Set up an email account on your iPhone, iPad, or iPod touch", Retrieved from <<https://support.apple.com/en-in/HT201320>>, Jan. 13, 2017, 5 Pages.
(Continued)

*Primary Examiner* — Kyung H Shin
(74) *Attorney, Agent, or Firm* — Christopher J. Volkmann; Kelly, Holt & Christenson, PLLC

(57) ABSTRACT

A user input indicating that an email account is to be added is detected. Search logic is controlled to automatically search for any preexisting email accounts corresponding to the user, and the configuration information corresponding to any preexisting accounts is obtained. A set of configuration information for the email account to be added is predicted, based upon the configuration information obtained from any preexisting accounts, and an email account is added, using the predicted configuration information.

20 Claims, 20 Drawing Sheets

(51) Int. Cl.
*G06F 3/0488* (2013.01)
*G06F 3/0481* (2013.01)

(52) U.S. Cl.
CPC ........ *G06F 3/0488* (2013.01); *G06F 3/04817* (2013.01)

(58) Field of Classification Search
USPC ........................................................ 709/206
See application file for complete search history.

(56) References Cited

U.S. PATENT DOCUMENTS

| | | | |
|---|---|---|---|
| 8,504,001 B2 | 8/2013 | Van Os et al. | |
| 9,686,308 B1* | 6/2017 | Srivastava | .............. H04L 51/12 |
| 2002/0112007 A1* | 8/2002 | Wood | ................... G06Q 10/107 709/206 |
| 2010/0145932 A1 | 6/2010 | Rook et al. | |
| 2013/0175333 A1* | 7/2013 | Gilbert | ............. H04N 21/41407 235/375 |
| 2014/0019559 A1 | 1/2014 | Schultz et al. | |

FOREIGN PATENT DOCUMENTS

| | | |
|---|---|---|
| CN | 102111292 A | 6/2011 |
| CN | 104539613 A | 4/2015 |

OTHER PUBLICATIONS

"Want to link Outlook with other email accounts? Here's how", Retrieved From <<https://www.digitaltrends.com/computing/how-to-use-outlook-with-gmail-yahoo-mail-and-other-services/>>, Aug. 24, 2015, 12 Pages.

* cited by examiner

LOCAL AND REMOTE SEARCH AND CONFIGURATION SYSTEM

BACKGROUND

Computing systems are currently in wide use. Some computing systems host services which can be accessed by various tenants or users.

For instance, a hosted service may be an electronic mail (or email) service. In order to use the service, users add a user account to the service so that the users can perform email operations (such as send and receive email messages, open email messages, delete email messages, configure folders and filters in their email account, among a wide variety of other things).

An email account has various settings or configuration inputs that define the account, and sometimes the way the account works. For instance, an email account illustratively has an associated email address, as well as user information (such as the name of the user) and login information. The login information may include a user name and a password or other authentication information. In addition, an email account illustratively includes an identity (e.g., location) of a server that receives incoming messages and the identity of a server that processes outgoing messages. It may also illustratively include an account type or server type which defines one of a plurality of different protocols that may be used in order to communicate with the user's mailbox on the account. It can include a variety of other setting information as well.

The discussion above is merely provided for general background information and is not intended to be used as an aid in determining the scope of the claimed subject matter.

SUMMARY

A user input indicating that an email account is to be added is detected. Search logic is controlled to automatically search for any preexisting email accounts corresponding to the user, and the configuration information corresponding to any preexisting accounts is obtained. A set of configuration information for the email account to be added is predicted, based upon the configuration information obtained from any preexisting accounts, and an email account is added, using the predicted configuration information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

It is not uncommon for a user to have one or more electronic mail (email) accounts, and then wish to add an additional account or to add one of the accounts to a new service. It may be that the user has added or used the preexisting email accounts from one device, and the user may wish to add an email account from a different device. By way of example, the user may have added one email account through his or her mobile device (e.g., smart phone), but then wishes to add another email account using his or her desk top computer. However, it is quite cumbersome for users to add the necessary configuration information and settings in order to add an email account to a service. Many users have insufficient knowledge to even enter the appropriate information. Similarly, even those users that do have enough knowledge to configure an email account, find the process lengthy, cumbersome, and may not even know the best information to enter.

Figure 1:
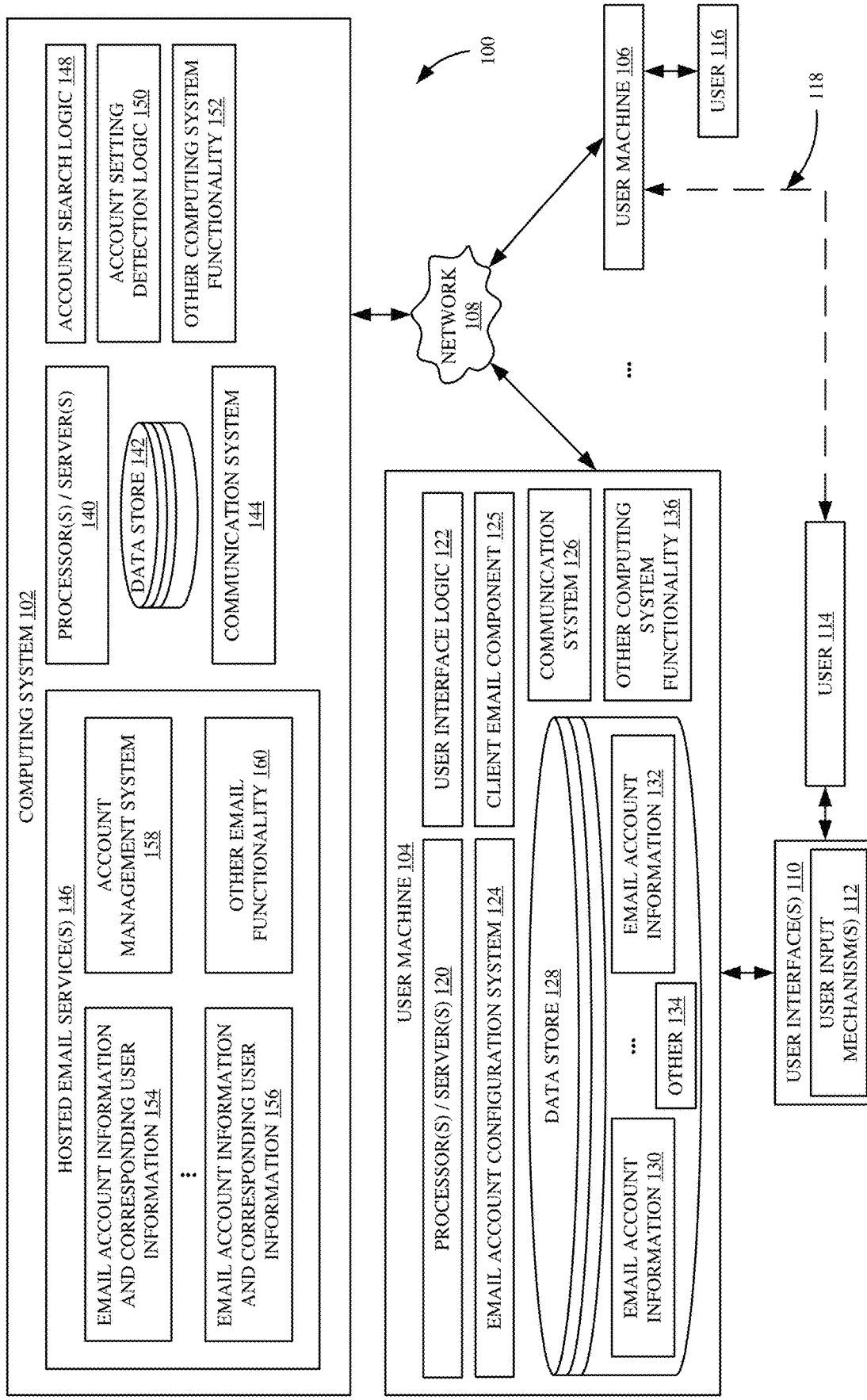
FIG. 1 is a block diagram of one example of a computing system architecture.

FIG. 1 is a block diagram of one example of a computing system architecture 100 in which configuration information from any preexisting email accounts that have already been set up by the user, can be obtained and used in automatically configuring an email account that the user is adding. Architecture 100, in the example shown in FIG. 1, illustratively includes computing system 102, and one or more user machines or user devices 104-106. In the example shown in FIG. 1, machines or devices 104-106 are connected to computing system 102 over network 108. Network 108, can, for example, be a wide area network, a local area network, a near field communication network, a cellular communication network, or any of a wide variety of other networks or combinations of networks.

Also, in the example shown in FIG. 1, user machine 104 is shown generating user interfaces 110, with user input mechanism 112, for interaction by user 114. User 114 illustratively interacts with user input mechanisms 112 in order to control and manipulate user machine 104, and some portions of computing system 102. In one example, user machine 106 can be a different user device that is also used by user 114. This is indicated by the dashed arrow 118. In another example, user machine 106 may be a different machine that is used by a different user 116. Both of these, and other architectures, are contemplated here. Also, in one example, computing system 102 may be accessed by additional user machines, which are not shown.

User machines 104 and 106 may be similar or different. For the sake of the present description, it will be assumed that they are similar so that only user machine 104 is described in more detail. In the example shown in in FIG. 1, user machine 104 illustratively includes one or more processors or servers 120, user interface logic 122, email account configuration system 124, client email component 125, communication system 126, data store 128 (which may store, among other things, email account information 130 for one email account, email account information 132 for another email account, and it can include a wide variety of other items 134) and other computing system functionality 136. User interface logic 122 illustratively generates user interfaces 110 and detects user interactions with user input mechanisms 112, or other user input mechanisms. Communication system 126 illustratively communicates with computing system 102 over network 108. It can communicate with other computing systems, or other users, as well.

Email account information 130 and 132 illustratively includes configuration or setting information that defines an email account that user 114 has used or is using. The email account information can be the configuration and setting information discussed above, or different information. Some examples of it are described in greater detail below.

User 114 illustratively uses email account configuration system 124 in order to manage the configuration of his or her email accounts. For instance, user 114 can use email account configuration system 124 to add an account, to change the configuration or setting information for an already-existing account, to delete an account, or to perform other actions. System 124, as is described in greater detail below, can search for pre-existing email accounts and use their configuration information in automatically configuring a new email account for user 114.

Where the email service that user 114 is using interacts with user machine 104 through a client email component, component 125 illustratively performs those actions. Client email component 125 is thus illustratively a component of the hosted email service that resides on user machine 104 and can interact with the hosted email service on computing system 102. It can generate user interfaces and detect user inputs corresponding to the hosted email service, and perform other actions. Alternatively, the hosted email service may not need a client email component 125. All of these and other architectures are contemplated herein.

Computing system 102 illustratively includes one or more processors or servers 140, data store 142, communication system 144, one or more hosted email services 146, account search logic 148, account settings detection logic 150, and it can include a wide variety of other computing system functionality 152. The hosted email services 146 can include email account information and corresponding user information 154 and 156 that may correspond to different user email accounts. They may be accounts of different users, or they may be accounts for the same user. The hosted email services 146 also illustratively include account management system 158 that may be accessed by an administrative user or end user in order to manage the email accounts hosted by the one or more hosted email services 146 on computing system 102. For instance, account management system 158 may be used to add a user email account, to modify a user email account, etc. Other email functionality 160 includes logic that enables a wide variety of other email functions to be performed by a user. Such functions can include things such as adding a new email account, modifying a new email account, authoring, sending and opening email messages, receiving email messages, managing the folders and filters in a user's mailbox, among a wide variety of other things.

The operation of account search logic 148 and account settings detection logic 150 is described in greater detail below. Briefly, however, when user 114 wishes to add a new email account, it may be that user 114 already has a pre-existing account which the user added earlier. Thus, it may be that the email account configuration system 124 on user machine 104 can use the configuration or setting information for that pre-existing account in order to configure the new account, automatically, for user 114. When user 114 wishes to add a new email account, account search logic 148 searches email account information and corresponding user information 154-156 on the hosted email services 146 to determine whether there is another email account already corresponding to user 114 (e.g., corresponding to the user information for the user logged into his or her user machine 104 and computing system 102). If so, then account settings detection logic 150 illustratively detects the settings and configuration information corresponding to the pre-existing accounts, that correspond to user 114. That information is then provided back to email account configuration system 124, which can consider it in determining how to automatically configure an email account for user 114.

Figure 2:
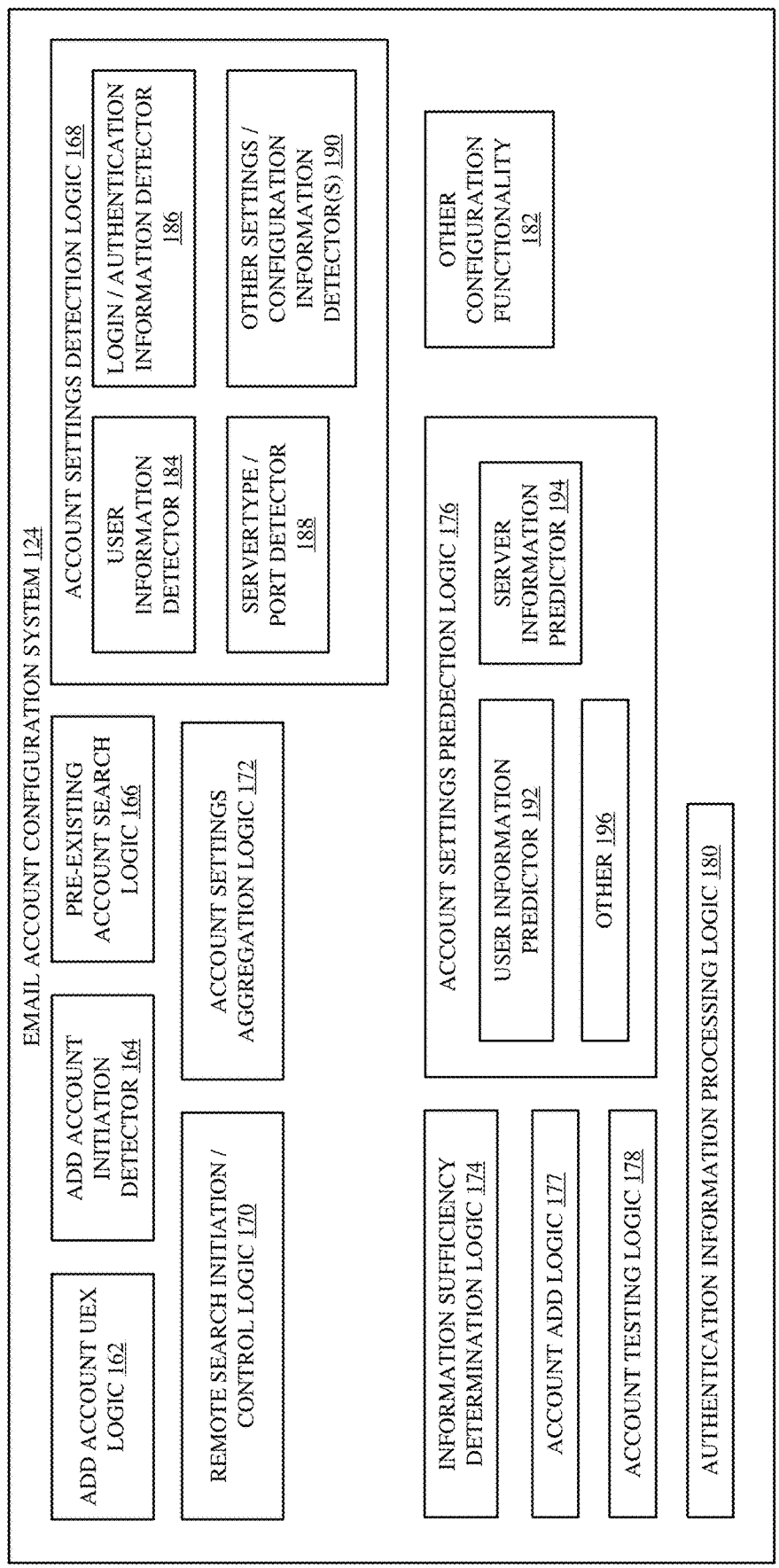
FIG. 2 is a block diagram showing one example of an electronic mail (email) account configuration system in more detail.

FIG. 2 is one example of a more detailed block diagram of email account configuration system 124. Before describing its operation, and the operation of architecture 100 shown in FIG. 1, in more detail, a brief description of the items in email account configuration system 124 will first be provided.

Email account configuration system 124 illustratively includes add account user experience (UEX) logic 162, add account initiation detector 164, pre-existing account search logic 166, account settings detection logic 168, remote search initiation/control logic 170, account settings aggregation logic 172, information sufficiency determination logic 174, account settings prediction logic 176, account add logic 177, account testing logic 178, authentication information processing logic 180, and it can include a wide variety of other configuration functionality 182. Account settings detection logic 168, itself, illustratively includes user information detector 184, login/authentication information detector 186, server type/port detector 188, and it can include a wide variety of other settings/configuration detectors 190. Account settings prediction logic 176, itself, illustratively includes user information predictor 192, server information predictor 194, and it can include a wide variety of other settings or configuration prediction logic 196.

Add account UEX logic 162 illustratively runs and controls a user experience which generates user interfaces and user input mechanisms so that user 114 can add an email account. Add account initiation detector 164 illustratively detects a user input indicating that the user wishes to add an account. Pre-existing account search logic 166 searches for any pre-existing email account information 130-132 on the user machine 104 that corresponds to a pre-existing email account that the user has already set up. When one is found, accounts settings detection logic 168 illustratively detects the settings or configuration information for that account. For instance, user information detector 184 detects user information (such as the email address, the user corresponding to the email address, etc.). Login/authentication information detector 186 illustratively detects the login information and/or authentication information corresponding to the email account. This can include such things as the user name and password corresponding to the account, and other things. Server type/port detector 188 illustratively detects the type of server corresponding to the account and the location of the incoming and outgoing servers, etc.

Similarly, remote search initiation/control logic 170 requests that account search logic 148 on computing system 102 also search system 102 for any pre-existing accounts corresponding to user 114. If any are found, account settings detection logic 150 detects the corresponding configuration or setting information and provides it to email account configuration system 124. The configuration or setting information for all pre-existing accounts can then be aggregated by aggregation logic 172.

Information sufficiency determination logic 174 then determines whether there is sufficient email account configuration or settings information corresponding to pre-existing accounts that the configuration or settings information corresponding to the account to be added can be predicted for the user. If not, logic 174 may interact with add account UEX logic 162 in order to surface user interfaces that allow the user to enter additional information, manually. Once adequate information is obtained, either automatically or manually, then account settings prediction logic 176 predicts the settings or configuration information for the user, for the email account to be added.

User information predictor 192 illustratively predicts user information, such as the email address, the identity of the user corresponding to the account, etc. Server information predictor 194 predicts the server information, such as the server type, the location of the incoming and outgoing servers, etc. Once the settings have been predicted, account add logic 177 adds the account and configures it using the predicted configuration information and account testing logic 178 tests the added email account, with those configuration settings, to ensure that it works. If not, then, logic 178 may control add account UEX logic 162 to generate user interfaces so that the user can manually add additional configuration or settings information, or change that information which was predicted by settings prediction logic 176.

Authentication information processing logic 180 illustratively processes any authentication information for user 114. For instance, it may control add account UEX logic 162 to surface user interfaces that ask user 114 for a password corresponding to the newly added account. It may surface user interfaces that ask the user to confirm the password, or to provide other authentication information that will correspond to the newly added account.

Figure 3A:
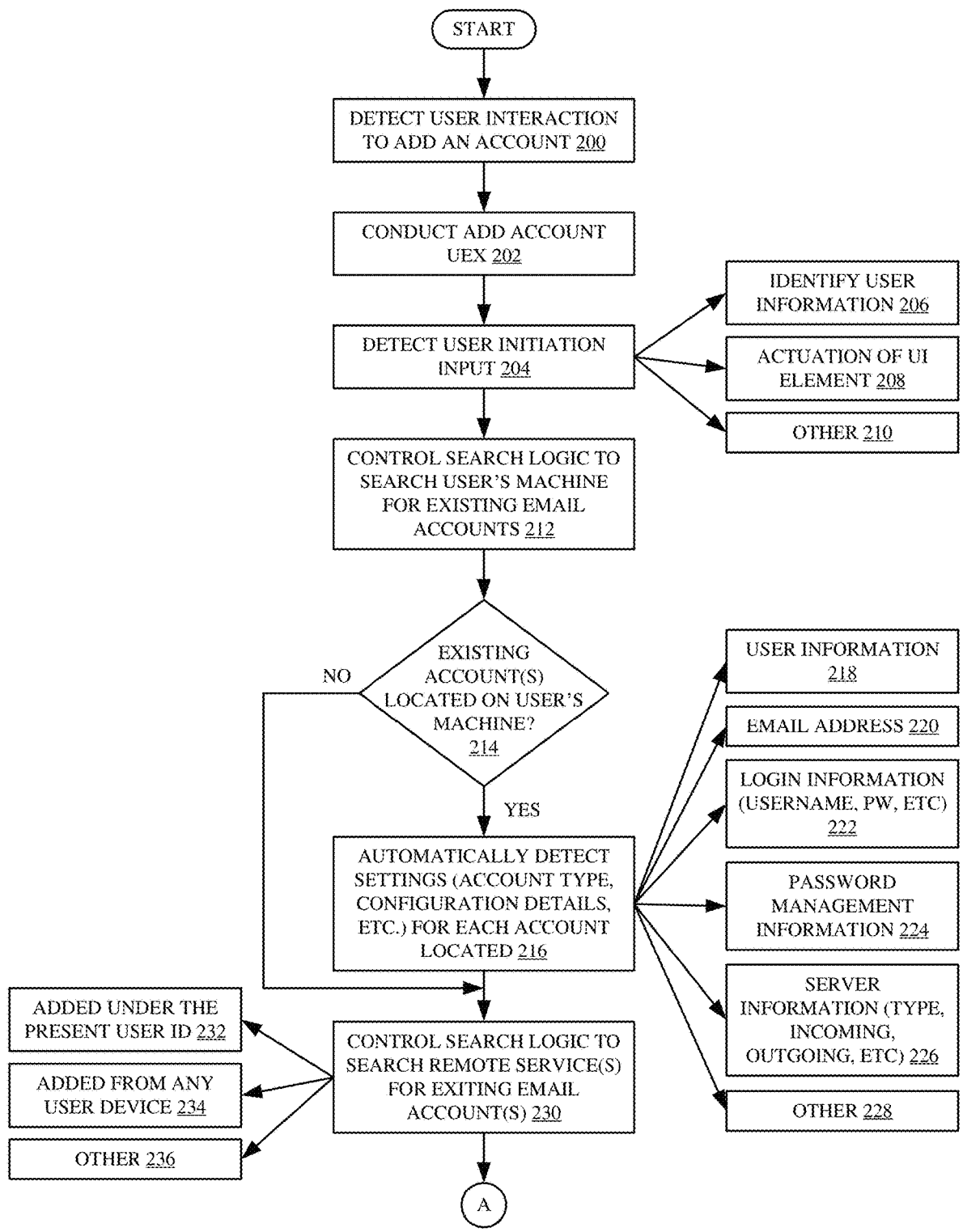
FIGS. 3A-3C (collectively referred to herein as FIG. 3) show a flow diagram illustrating one example of the operation of the architecture shown in FIGS. 1 and 2 in adding an email account for a user.
Figure 3B:
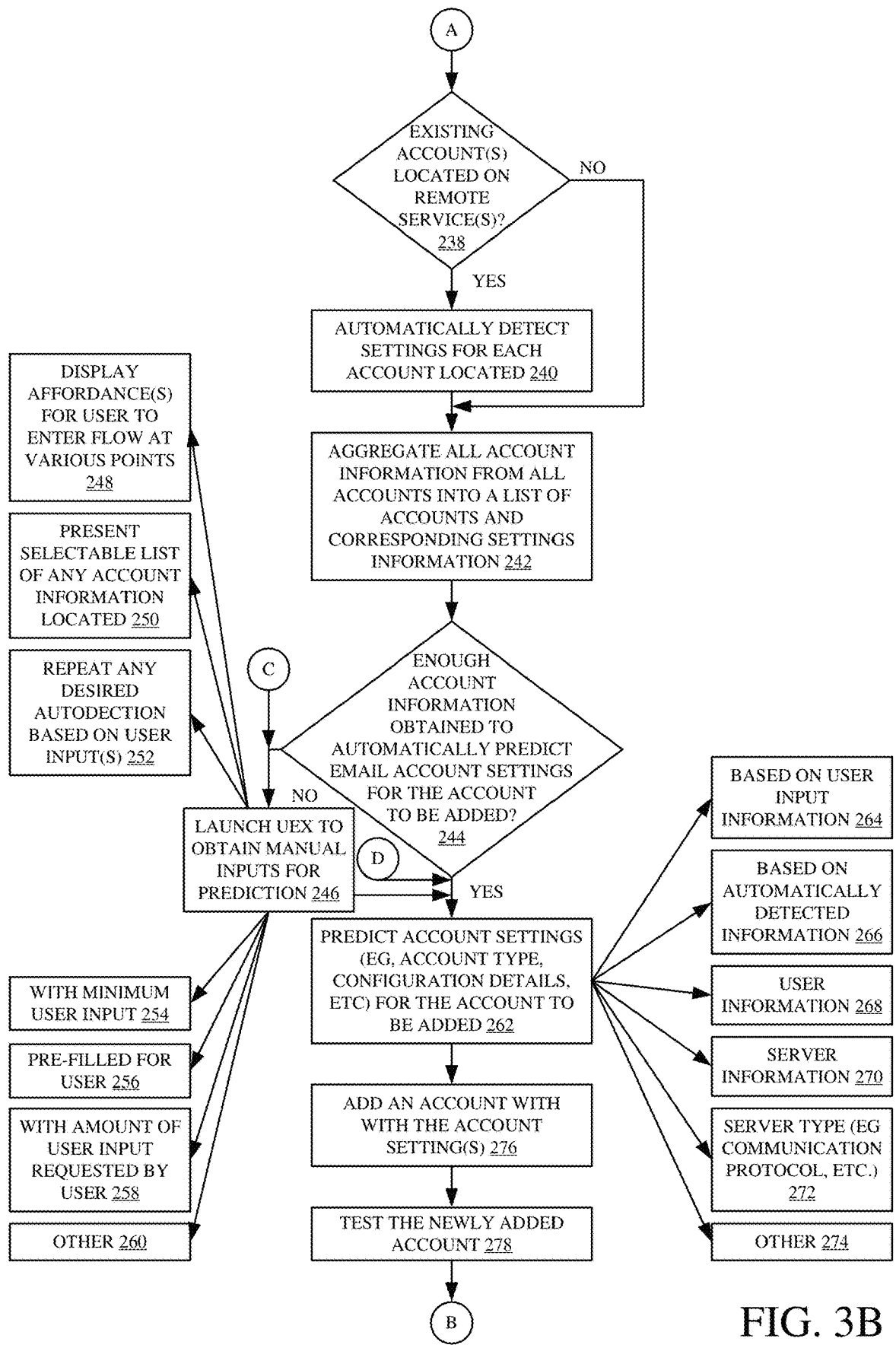
Figure 3C:
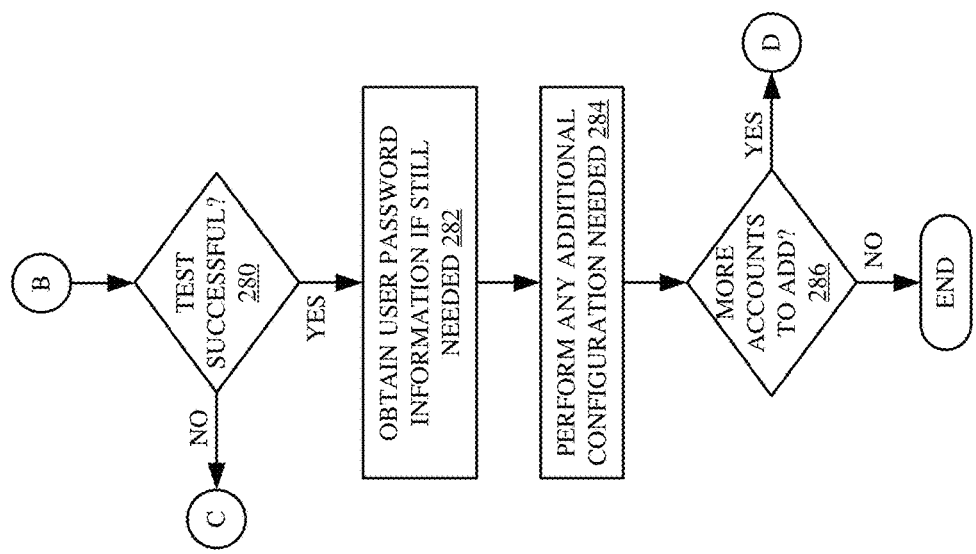

FIGS. 3A-3C (collectively referred to herein as FIG. 3) show a flow diagram illustrating one example of the operation of the architecture shown in FIG. 1, and email account configuration system 124, in more detail. In one example, user 114 first provides an input that is detected by add account UEX logic 162 in email account configuration system 124, that indicates that the user wishes to add an email account. The user can do this by actuating a user interface element or user input mechanism, by navigating to a particular location using a browser, and by interacting with system 124 in other ways. Detecting user interaction to add an email account is indicated by block 200 in the flow diagram of FIG. 3. Add account UEX logic 162 then conducts a user experience by displaying user interface displays, with suitable user input mechanisms, so that user 114 can add an email account. Conducting the "add account" UEX is indicated by block 202 in the flow diagram of FIG. 3.

At some point, during the user experience, the user will actuate a user input mechanism indicating that the user wishes to initiate the process of adding an email account. This is indicated by block 204. Add account initiation detector 164 illustratively detects the user input, through a suitable user input mechanism, or in other ways. Also, at some point during the process, user information detector 184 illustratively detects the user information of the user adding the account. This may be in response to the initiation input detected by detector 164, or when the user logs into his or her user machine 104 or into the hosted email service 146 to which the user wishes to add an account, or in other ways. Identifying the user information is indicated by block 206. Initiating the add account processing by actuating a UI element is indicated by block 208. The initiation can include identifying other information and it can be detected in other ways as well, and this is indicated by block 210.

The processors or servers 120 then control pre-existing account search logic 166 to search the user machine 104 for any existing email accounts that the user has already set up. This is indicated by block 212. For instance, pre-existing account search logic 166 can search data store 128, and the email account information 130-132 stored on the data store 128 to determine whether it corresponds to an email account that belongs to (or was set up by) user 114.

If pre-existing account search logic 166 identifies any pre-existing email accounts on user machine 104, as indicated by block 214, then account settings detection logic 168 automatically detects the settings or configuration information (such as the account type, the configuration details, etc.) for each pre-existing account that has been located. This is indicated by block 216 in the flow diagram of FIG. 3. The settings or configuration information can take a wide variety of different forms. For instance, user information detector 184 can illustratively detect user information 218 corresponding to the detected, pre-existing email account. Login/authentication information detector 186 can illustratively detect the email address 220 corresponding to the account, as well as other login information 222 (such as the user name, password, etc.) corresponding to the account. Detector 186 also illustratively detects password management information, such as whether the password is to be remembered by user machine 104, etc. The password management information is indicated by block 224. Server type/port detector 188 illustratively detects server information 226. This can include such things as the type of account (e.g., the particular protocol used to communicate with the inbox corresponding to the email account, the location or identity of the incoming server, that accepts incoming messages, and the outgoing server, that delivers outgoing messages from the email account, among other things). The automatically detected settings and configuration information can include a wide variety of other information 228, as well.

In one example, remote search initiation/control logic 170 illustratively controls account search logic 148 on remote computing system 102 to search remote computing system 102 for any pre-existing email accounts that user 114 may have set up. Controlling search logic 148 can be done by sending a request to search logic 148 that it search for pre-existing email accounts for user 114, or it can be a more direct control. These and other control mechanisms are contemplated herein. Controlling account search logic 148 to search remote hosted email services 146 for pre-existing email accounts is indicated by block 230 in the flow diagram of FIG. 3.

Account search logic 148 then searches the email account information and corresponding user information 154-156 on the various hosted email services 146 to determine whether any other email accounts were added under the present user identifying information. This is indicated by block 232. For instance, it may be that user 114 logged into computing system 102 on a prior occasion, and opened other email accounts in the same or different hosted email services 146. The corresponding user information will then illustratively identify user 114 as the user that the email account belongs to. Thus, account search logic 148 can search for any pre-existing email accounts that belong to user 114, based upon the user information for the corresponding email accounts.

It will also be noted that user 114 may have added the email accounts using any other user devices, even devices other than user machine 104. This is indicated by block 234. By way of example, it may be that user 114 used user machine 104 (which may be a desk top computer) to add an email account on one of the hosted email services 146. It may also be that user 114 used another user machine 106 (which may, for instance, be the user's mobile device or smart phone) to add different email account in one or more of the hosted email services 146. In one example, account search logic 148 identifies all of these different email accounts that correspond to user 114, regardless of the particular user machine from which they were added.

Account search logic 148 can be controlled in a variety of different ways, to search for pre-existing email accounts corresponding to user 114. Controlling search logic 148 to search in other ways is indicated by block 236 in the flow diagram of FIG. 3.

If any pre-existing accounts are identified on the one or more remote hosted email services 146, as indicated by block 238 in the flow diagram of FIG. 3, then account settings detection logic 158 is controlled to automatically detect the account settings and/or configuration information for each of the email accounts located on the remote hosted email services 146. This is indicated by block 240. The detected settings or configuration information can include the same information as described above with respect to blocks 216-228, or it can be different or additional information as well.

Once the settings and configuration information for all pre-existing email accounts has been detected (e.g., for all pre-existing accounts on user machine 104 or any other user machines belonging to user 114) and all of those identified in a remote hosted email service 146, then account settings aggregation logic 172 aggregates all of the account information from all of the accounts into a list of accounts and their corresponding settings or configuration information. This is indicated by block 242 in flow diagram of FIG. 3.

Information sufficiency determination logic 174 then determines whether there is sufficient automatically detected settings and configuration information to predict the settings and configuration for the new account that user 114 wishes to add. By way of example, logic 174 may determine that no pre-existing email accounts have been identified. It may also determine that while one or more pre-existing email accounts have been identified, the settings and configuration information that have been automatically detected are insufficient, in one way or another, to predict the settings and configuration for the new email account to be added. For instance, there may be a deficiency in that a certain piece of configuration or settings information is unavailable or unusable for some reason. Determining whether enough account information has been obtained to automatically predict the settings and configuration information for the new email account to be added is indicated by block 244 in the flow diagram of FIG. 3.

If not, then logic 174 interacts with add account UEX logic 162 to launch a user experience (or return to various manual input pages on a user experience) to obtain manual inputs that provide information needed to predict or setup and configure the new email account to be added by user 114 (e.g., to obtain the information identified by the definiency). This is indicated by block 246 in the flow diagram of FIG. 3. In one example, add account UEX logic 162 displays user interface affordances that allow the user to enter the configuration flow at various points in the UEX where manual input of information is needed. This is indicated by block 248. Also, add account UEX logic 162 may present a selectable list of any account information that has already been identified and in response to a manual input of other information, it can repeat any of the desired autodetection steps described above, based upon the additional information received from the user. Presenting a selectable list of any account information located, for selection by user 114, is indicated by block 250, and repeating any desired autodetection based on any manual inputs is indicated by block 252.

In one example, add account UEX logic 162 conducts the user experience so that a minimum amount of user interaction or user input of information is needed. This is indicated by block 254. In one example, the automatically detected information can be used to prefill fields on a manual input page so that the user need not input the information that is already known, unless the user wishes to change it. Prefilling the manual input page for the user, with automatically detected information, is indicated by block 256.

Also, in one example, the user input affordances allow user 214 to indicate that he or she wishes to have more involvement in the configuration process. In that case, the user will be presented with user interfaces, and suitable user input mechanisms, that allow the user to perform detailed configuration and settings processes in order to configure the email account to be added. Providing the user experience with the amount of user involvement and input requested by the user is indicated by block 258. The user experience can be launched and controlled in a wide variety of ways as well, and this is indicated by block 260. Some examples of user interface displays and user input mechanisms or other user interface affordances are described in more detail below with respect to FIGS. 4A-4J.

If, at block 244, it is determined by information sufficiency determination logic 174 that a sufficient amount of configuration and settings information has been automatically detected to predict how the user's new email account should be configured, then account settings prediction logic 176 generates predicted values for the various configurations and settings information. User information predictor 192 can illustratively predict the user information. Server information predictor 194 illustratively predicts the server information, the server type, etc. The server information not only includes the communication protocol to communicate with the mailbox, but it can include the identity and/or location of the incoming server, the outgoing server, etc. Predicting the account settings (e.g., account type) or communication protocol, configuration details, etc. for the account to be added is indicated by block 262 in the flow diagram of FIG. 3. This can be based on user input information that was manually added in the user experience launched above with respect to block 246. This is indicated by block 264 in the flow diagram of FIG. 3. It can be based on automatically detected information as indicated by block 266. It can include a wide variety of settings or configuration information, such as user information 268, server information 270, server type information (e.g., the communication protocol used to communicate with the mailbox in the newly added user account, as indicated by block 272, and it can include a wide variety of other configurations or settings information 274.

Account add logic 177 then adds an email account with the predicted account settings on the hosted email service 146. This is indicated by block 276 in the flow diagram of FIG. 3. Account testing logic 178 then tests the newly added account to determine whether it works. This may include determining whether the communication protocol works, determining whether the appropriate incoming and outgoing servers have been identified, etc. Testing the newly added account is indicated by block 278.

If, at block 280, account testing logic 178 determines that the newly added email account does not work, it outputs a signal indicative of this and processing reverts to block 246 where a user experience is launched to obtain manual input of the configuration and settings information that is needed to make the account test successful. If, at block 280, new account testing logic 178 determines that adding the new email account was successful, then authentication information processing logic 180 illustratively obtains the user password and/or other authentication information from user 114, if it is still needed. This is indicated by block 282. It will be noted that the user's password and/or other authentication information may be obtained earlier in the process, as well. However, if the desired authentication information for the newly added email account has not yet been received, then logic 180 illustratively controls user interface logic 122 to prompt user 114 to enter, and confirm, his or her password and/or other authentication information.

Other configuration functionality 182 can also perform any additional configuration that may be needed or desired for the newly added email account. This is indicated by block 284.

It may also be that user 114 wishes to add another email account. If so, then processing again reverts to block 262 where the already-detected configuration and settings information is used, along with the newly added configuration and settings information for the newly added email account, to predict the settings and configuration information for another email account. Determining whether more accounts are to be added is indicated by block 286 in the flow diagram of FIG. 3.

FIGS. 4A-4J show a number of different user interface displays that can be generated. It will be appreciated that they are examples only, and a wide variety of different or additional user interfaces, with other user input mechanisms can be generated as well. In addition, they can be generated in a different order, or otherwise.

Figure 4A:
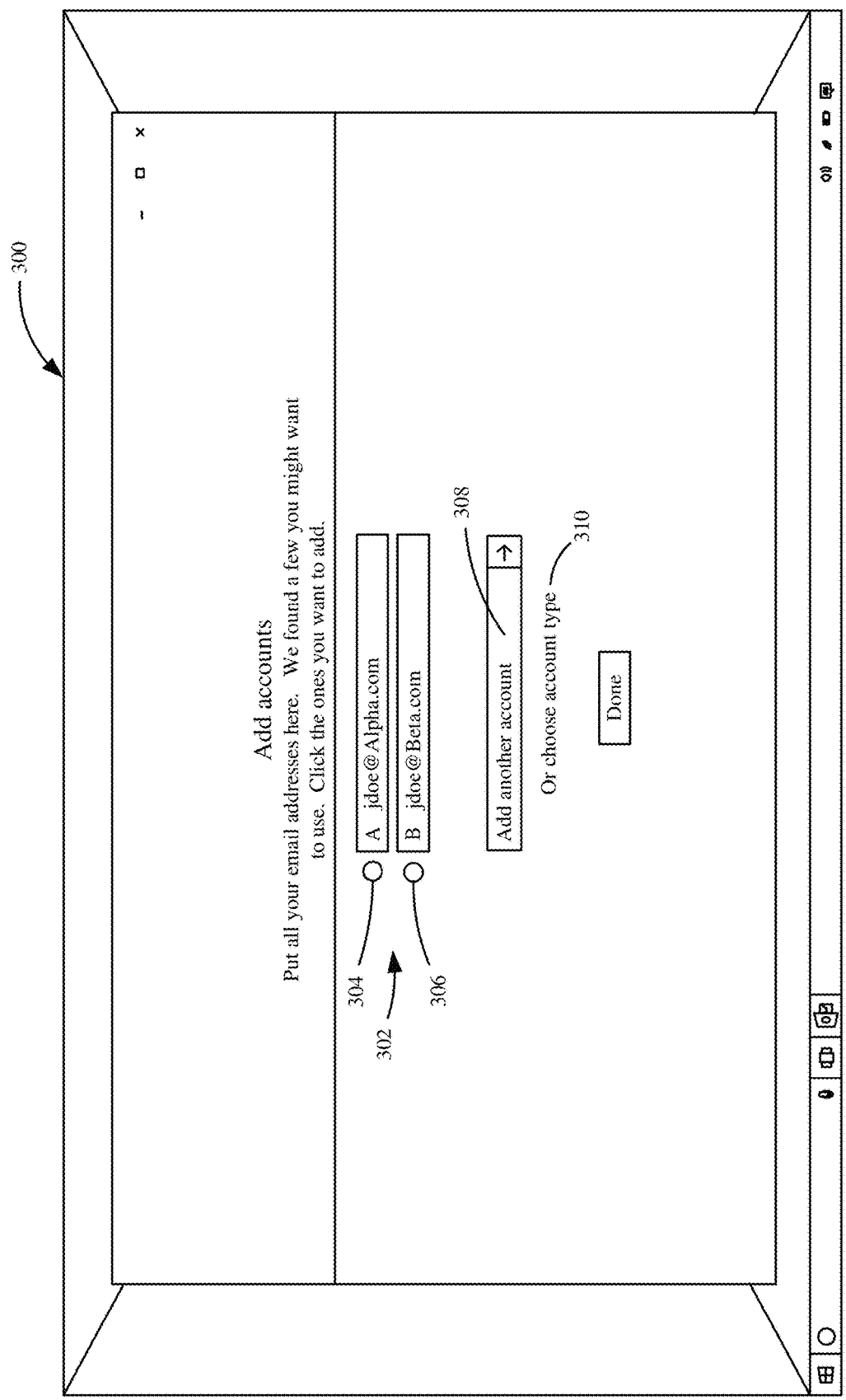
FIGS. 4A-4J show examples of user interface displays that can be generated.

FIG. 4A shows one example of a user interface display 300. User interface display 300 can be generated by add account UEX logic 162, for instance, after account settings aggregation logic 172 aggregates the various account information for pre-existing email accounts that have been identified, into a list. The list is generally indicated at 302, and each pre-existing account has a selectable affordance 304-306 that the user can actuate in order to select the particular account that the user wishes to add. In one example, the user can also actuate an actuatable element 308 in order to add an additional account that the user may specify. Further, affordance 310 can be actuated in order for user 114 to choose an account type. It can thus be seen that user interface display 300 allows the user to have different levels of participation in the account configuration and settings process. The user can simply select a pre-existing account, the user can specify another account, or the user can select an account type.

Figure 4B:
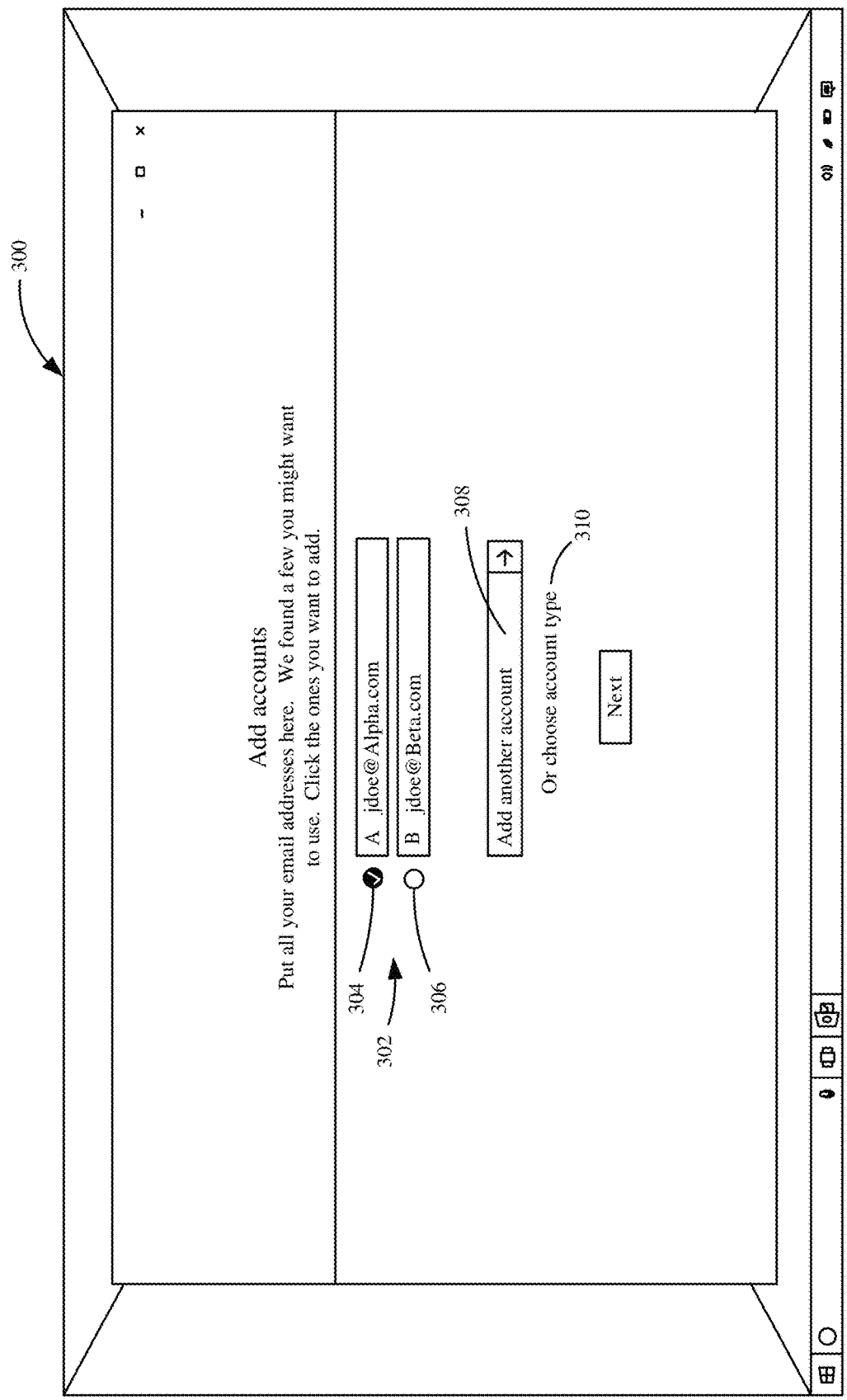

FIG. 4B shows user interface display 300, where user 114 has actuated element 304 to choose the corresponding email account that is to be added. The configuration/settings information for the selected account is then used to add the email account, as desired by user 114. Other items in FIG. 4B are similar to those shown in FIG. 4A and they are similarly numbered.

Figure 4C:
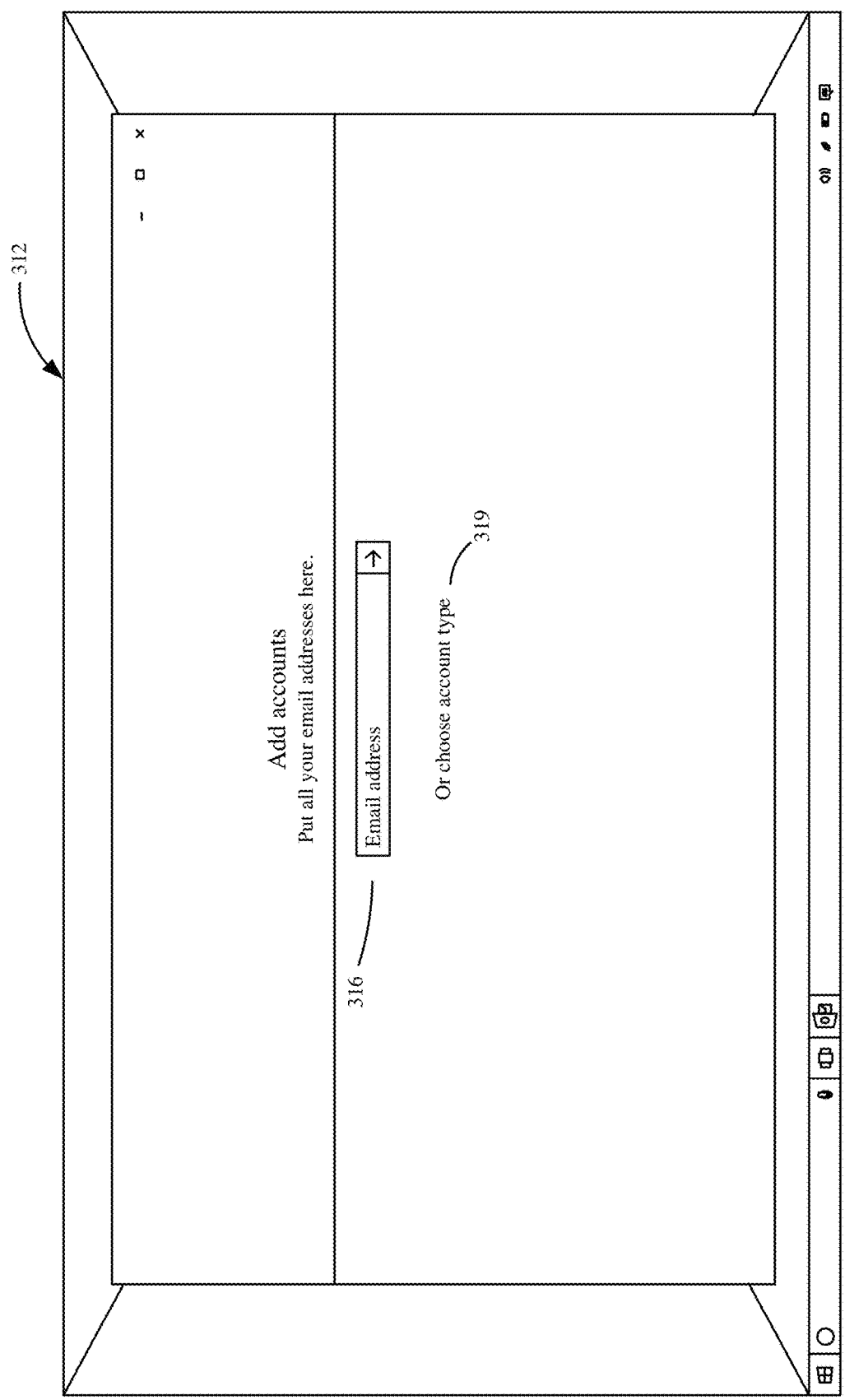
Figure 4D:
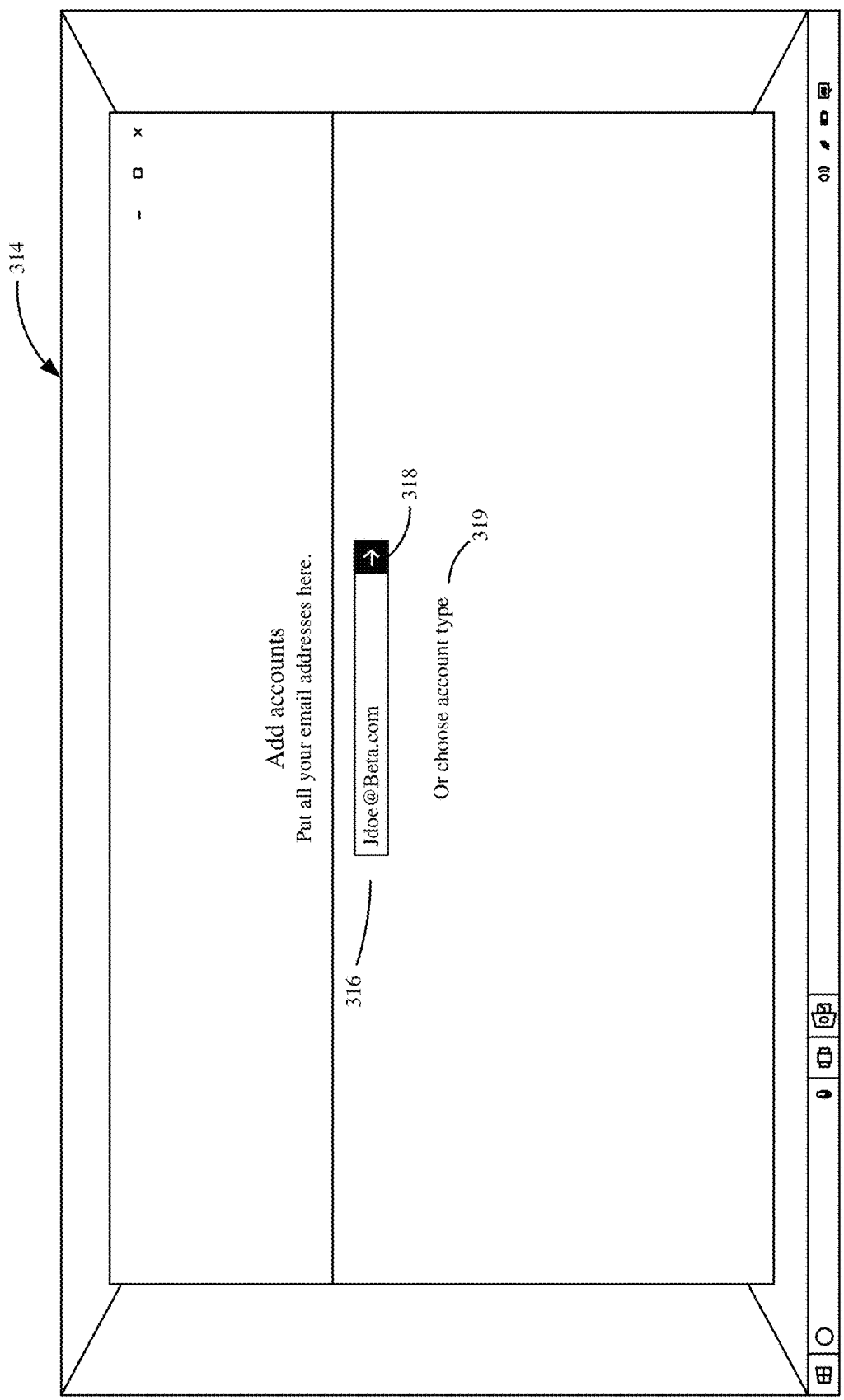

FIGS. 4C and 4D show user interface displays 312 and 314, respectively, that can be generated when pre-existing account search logic 166 and account search logic 148 do not detect any pre-existing accounts for user 114. Thus, display 312 requests that the user enter his or her pre-existing email accounts into user input mechanism 316. FIG. 4C shows that, once the user has entered a valid SMTP address into box 316, a next actuator 318 is enabled. When the user actuates next actuator 318, then account settings detection logic 168 and account settings detection logic 150 detect the account settings and configuration information corresponding to the email address that the user entered in box 316. That information will be automatically detected and can be used to predict the settings or configuration information for the account that the user wishes to add.

Figure 4E:
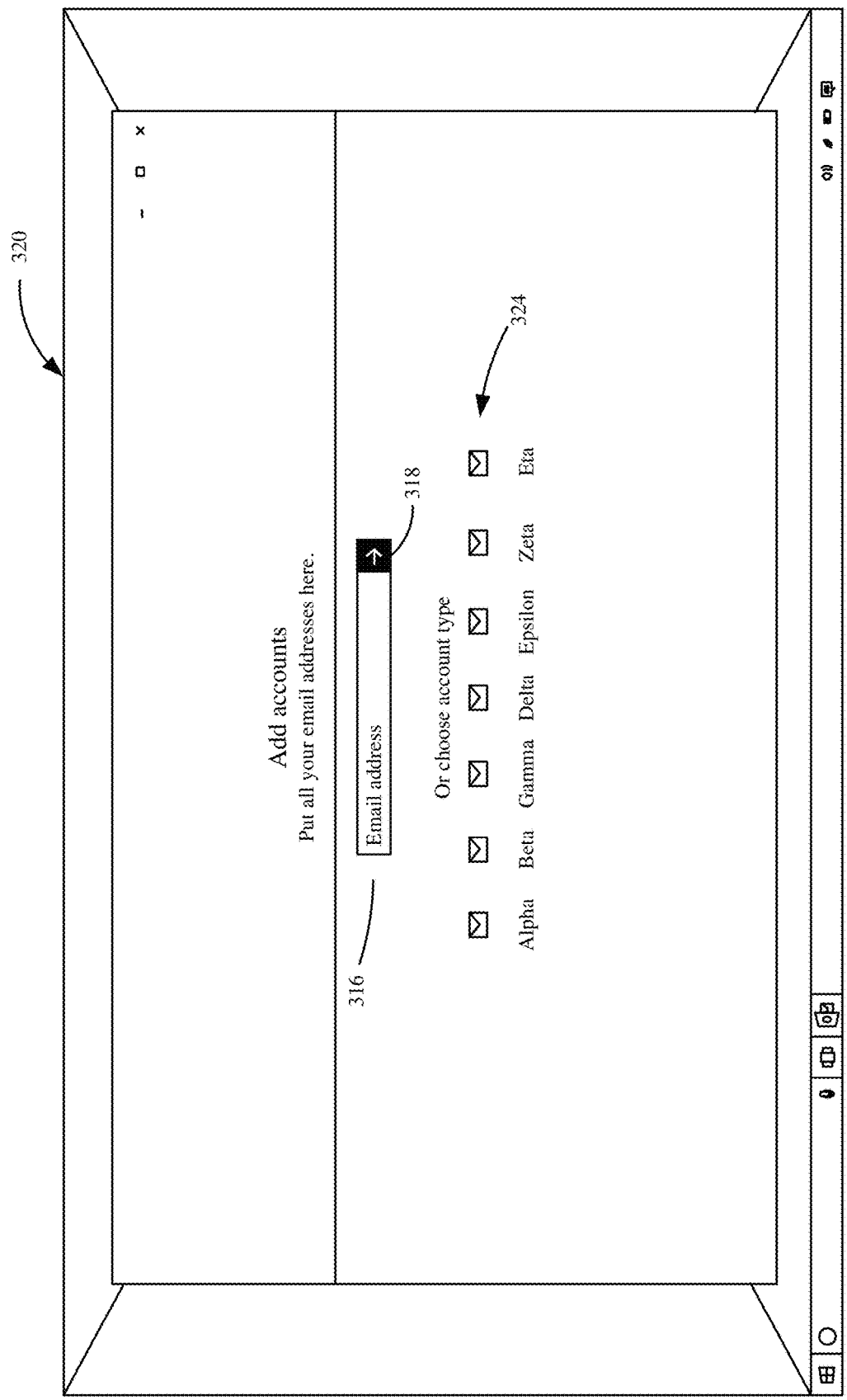
Figure 4F:
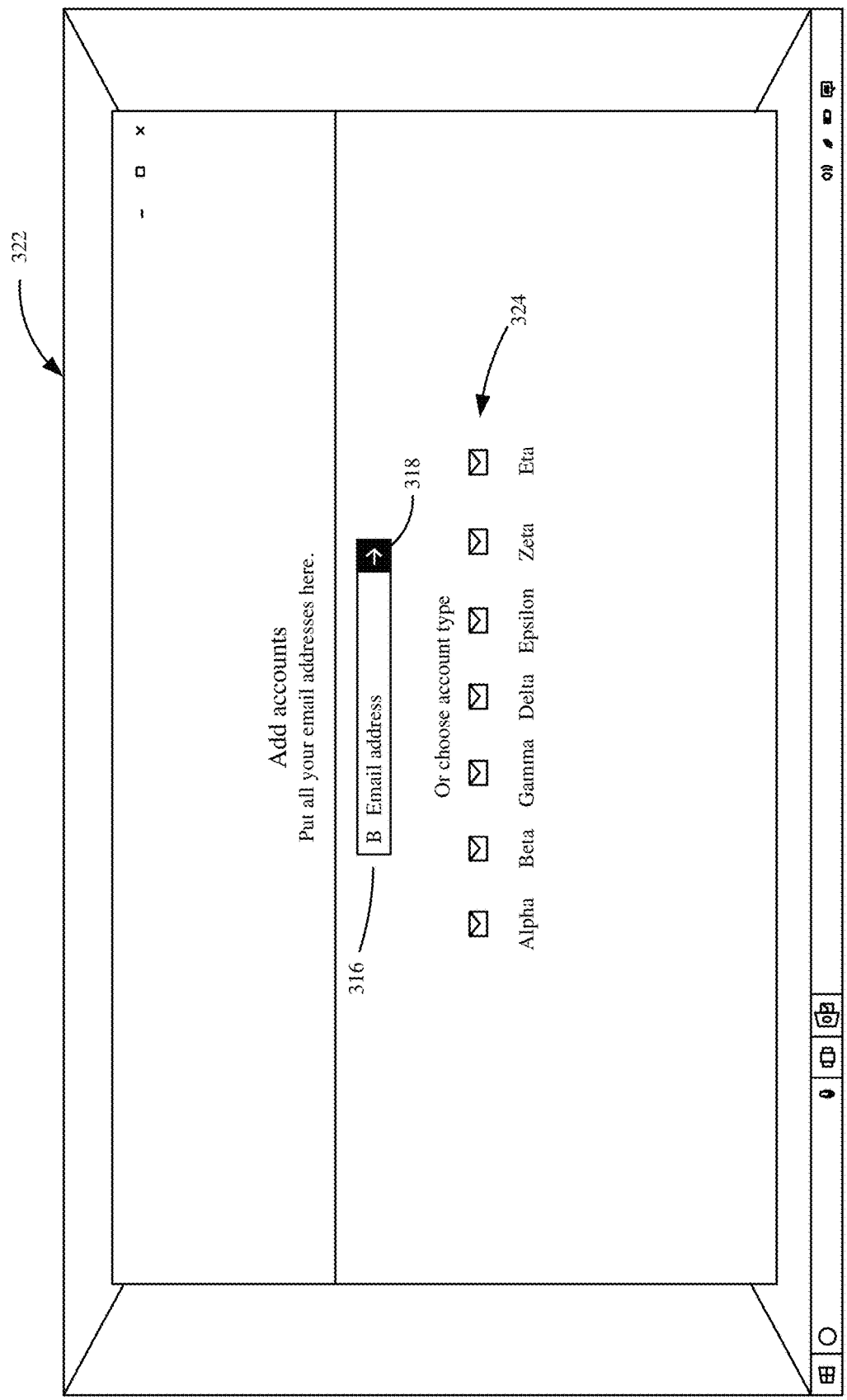

FIGS. 4E and 4F show user interface displays 320 and 322, respectively, which can be generated when the user actuates the "choose account type" actuator 319 in one of user interface displays 312 or 314, or when the user actuates actuator 310 in user interface display 300. In FIG. 4E, the user is presented with a plurality of different actuators 324, each of which correspond to a different account type (e.g., they may each correspond to a different communication protocol that can be used to communicate with the mailbox of the account, or they can be of different types). FIG. 4F shows that the user has actuated or selected one of actuators 324, so that it appears in block 316. The user then adds an email address or a syntactically valid SMTP address and can then actuate the "next" button 318, which will then be enabled.

Figure 4G:
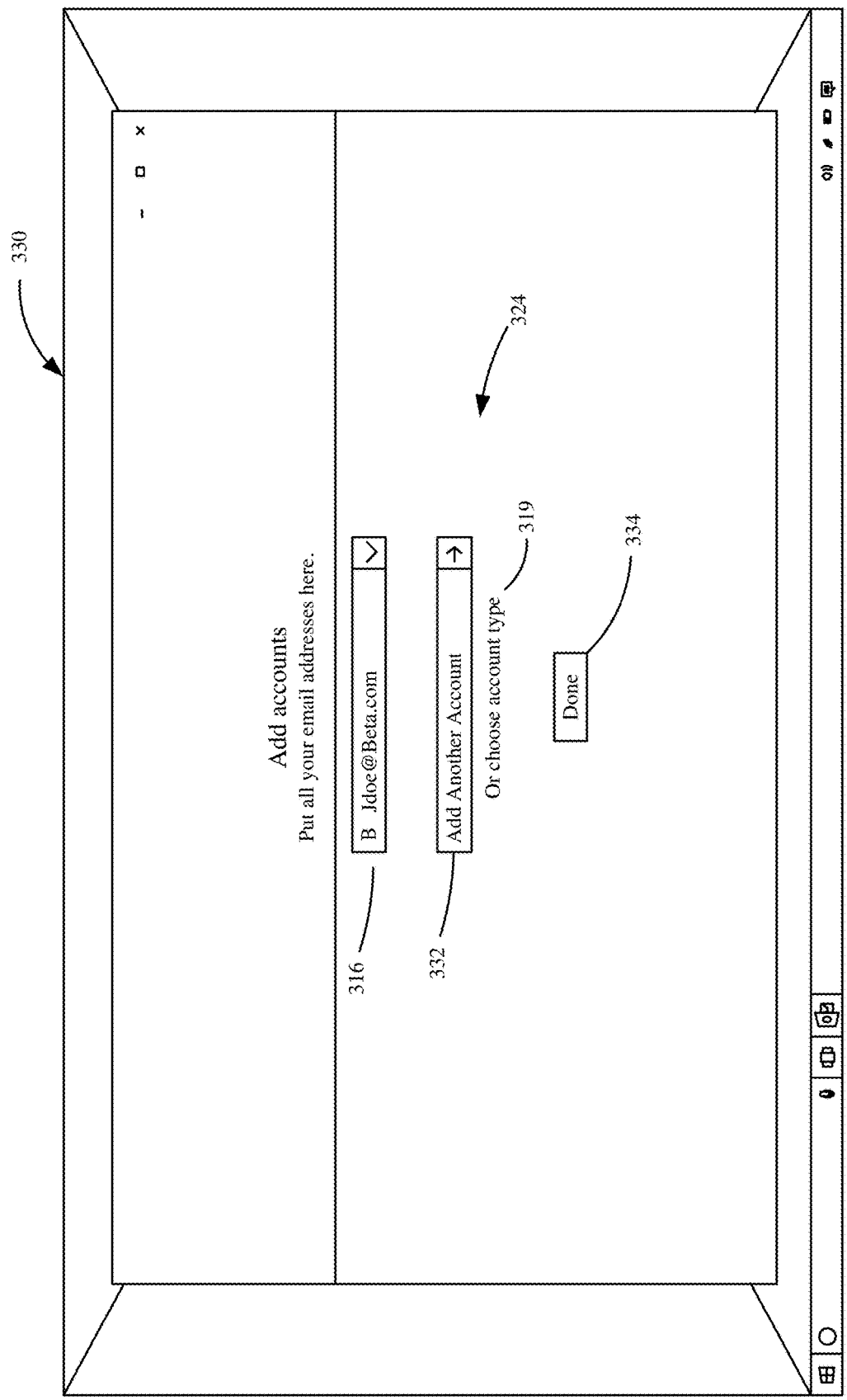

FIG. 4G shows yet another example of a user interface display 330. Display 330 can be generated after the user has successfully added an account. The newly added account is displayed in block 316. The user is then provided with an additional affordance 332 that allows the user to add another account, if desired. The user can again choose an account type using actuator 319, or the user can indicate that he or she is finished adding accounts at this time, by actuating affordance 334.

Figure 4H:
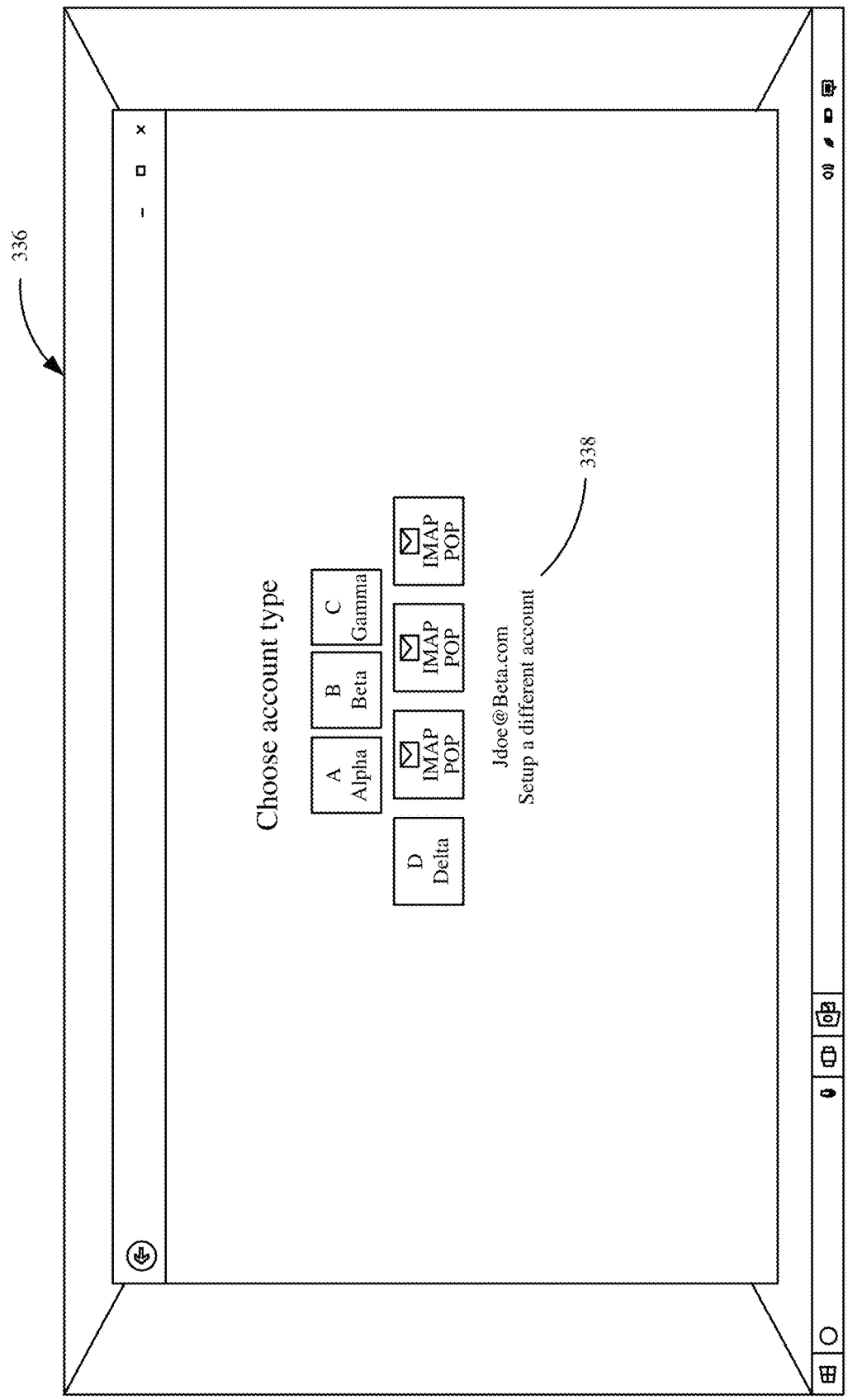
Figure 4I:
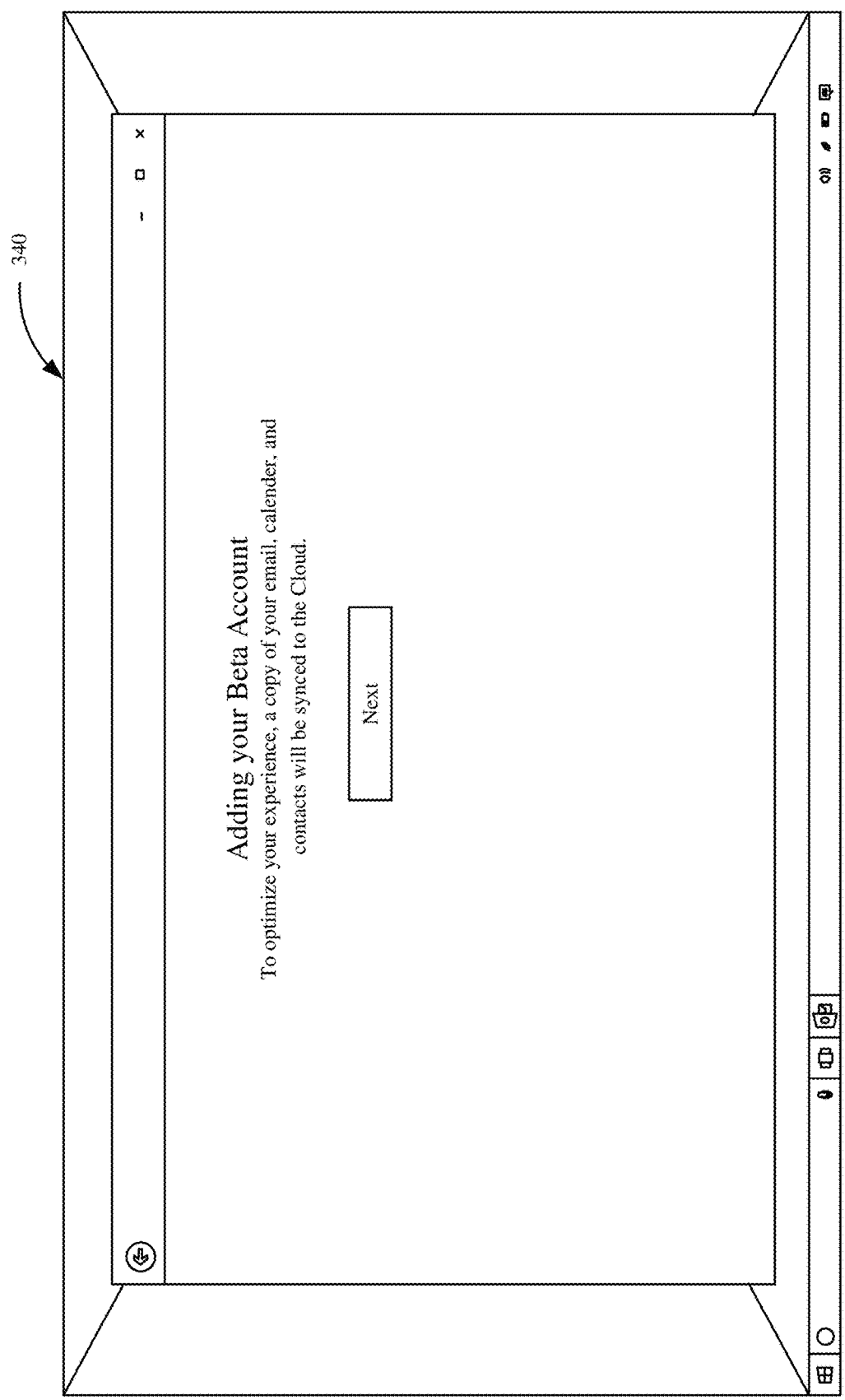

FIG. 4H shows a user interface display 336 that can be generated to allow the user to choose an account type in a different way than that shown in FIGS. 4E and 4F. It can be seen in FIG. 4H that the various account types each have an actuator but they are arranged differently from the previous Figures. In addition, the user is provided with an additional actuator 338 that allows the user to enter a more manually intensive process of setting up an account. When the user actuates actuator 338, the user can be navigated to a manual input interface that allows the user to input more detailed configuration or setting information.

It may be that the user wishes to be informed of, and consent to, the creation of a mailbox in a remote (e.g., cloud-based) computer system. In that case, add account UEX logic 162 can generate a user interface display, such as display 340 shown in FIG. 4I. The user is offered an opportunity to consent to the movement of various user information (e.g., the user's mailbox, calendar and contact information) to a remote, cloud storage system.

Figure 4J:
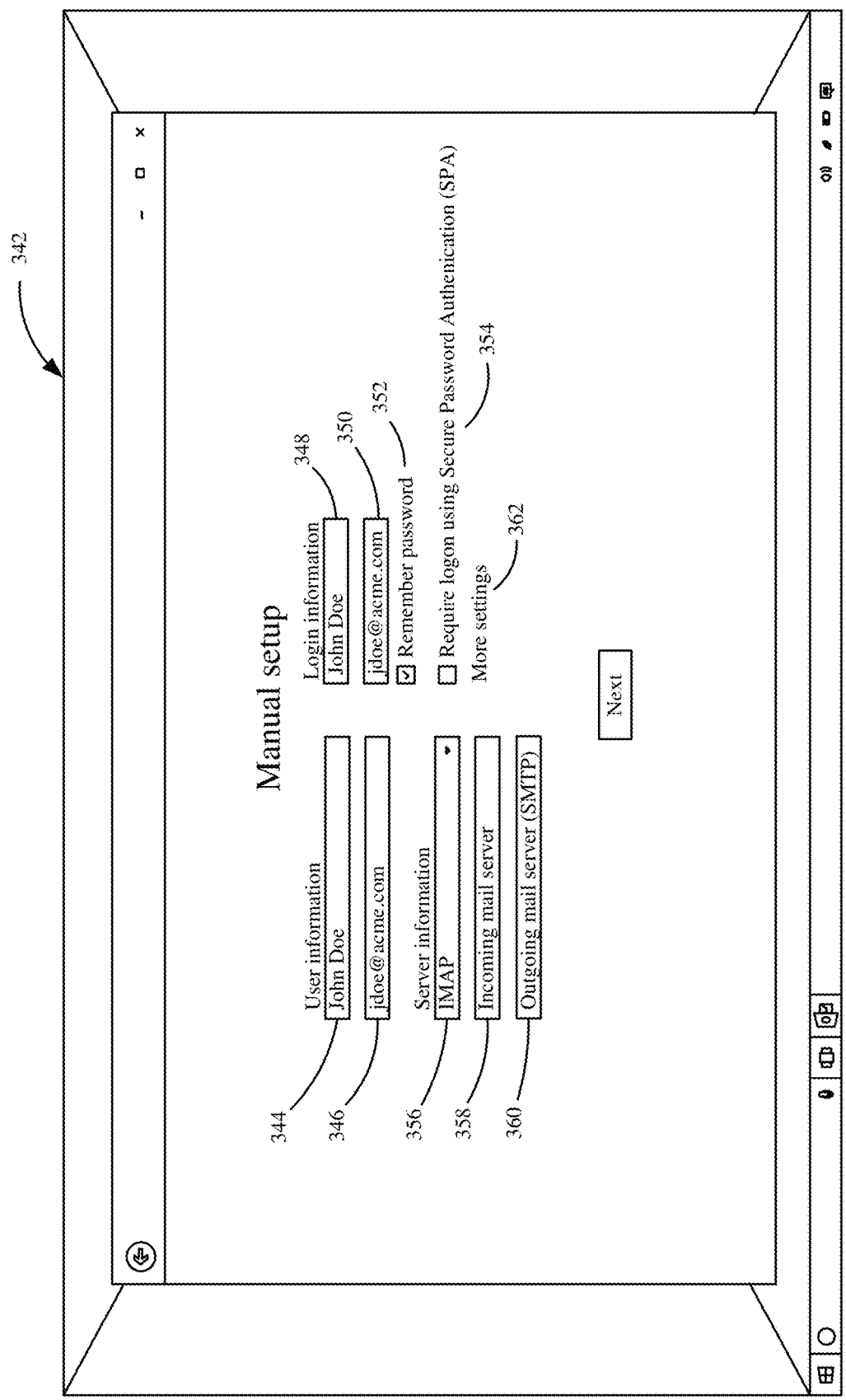

FIG. 4J shows one example of a user interface display 342 that can be generated at a variety of different times. For example, when the user actuates a display element indicating that the user wishes to have more manual involvement in setting up the account, then add account UEX logic 162 can generate display 342. In addition, where insufficient settings or configuration information has been automatically detected, or where no pre-existing accounts have been detected, then logic 162 may generate user interface display 342. Display 342 illustratively allows the user to enter a relatively large amount of settings or configuration information. For instance, the user can enter his or her user information (e.g., his or her name, etc.) in box 344. The user can enter his or her email address in box 346. The user can enter login information such as an email or a user name at box 348. The user can enter his or her password at box 350. The user can choose whether the computing system is to remember his or her password by actuating actuator 352 and the user can set additional authentication information by actuating box 354. The user can set server information (such as the account type at box 356, the incoming and outgoing server locations or address at boxes 358 and 360). The user can enter additional settings or configuration information by actuating interface display element 362. Again, the user interface displays shown in FIGS. 4A-4J are only examples, and a wide variety of other, or additional or different user interface displays can be generated.

It can thus be seen that the present system detects a user intention to add an email account to a service. Search logic is then controlled to search the user's local machine, but can also search any remote services that the user belongs to, for any pre-existing email accounts that the user has already set up or configured. These are then presented in a user actuatable list to the user so that the user can select one of them. Also, the settings or configuration information for the pre-existing email accounts can be used to predict the settings or configuration information for the account that the user wishes to add. The present system also provides for additional user involvement, if the user wishes, or if insufficient pre-existing account information is automatically detected. Thus, the system provides various levels of user involvement, that can be selected by the user, or that can be directed by the system automatically, based upon the amount of information detected. In addition, this improves the computing system itself. The user need not enter large amounts of information, and this saves processing overhead in rendering the user interface displays needed to enter that information. It also increases the efficiency of the system because new accounts can be tested automatically so that user input is only requested when it is needed, or when the user wishes it. These things not only enhance the computing system itself, but they also greatly enhance the user experience in setting up a new email account.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
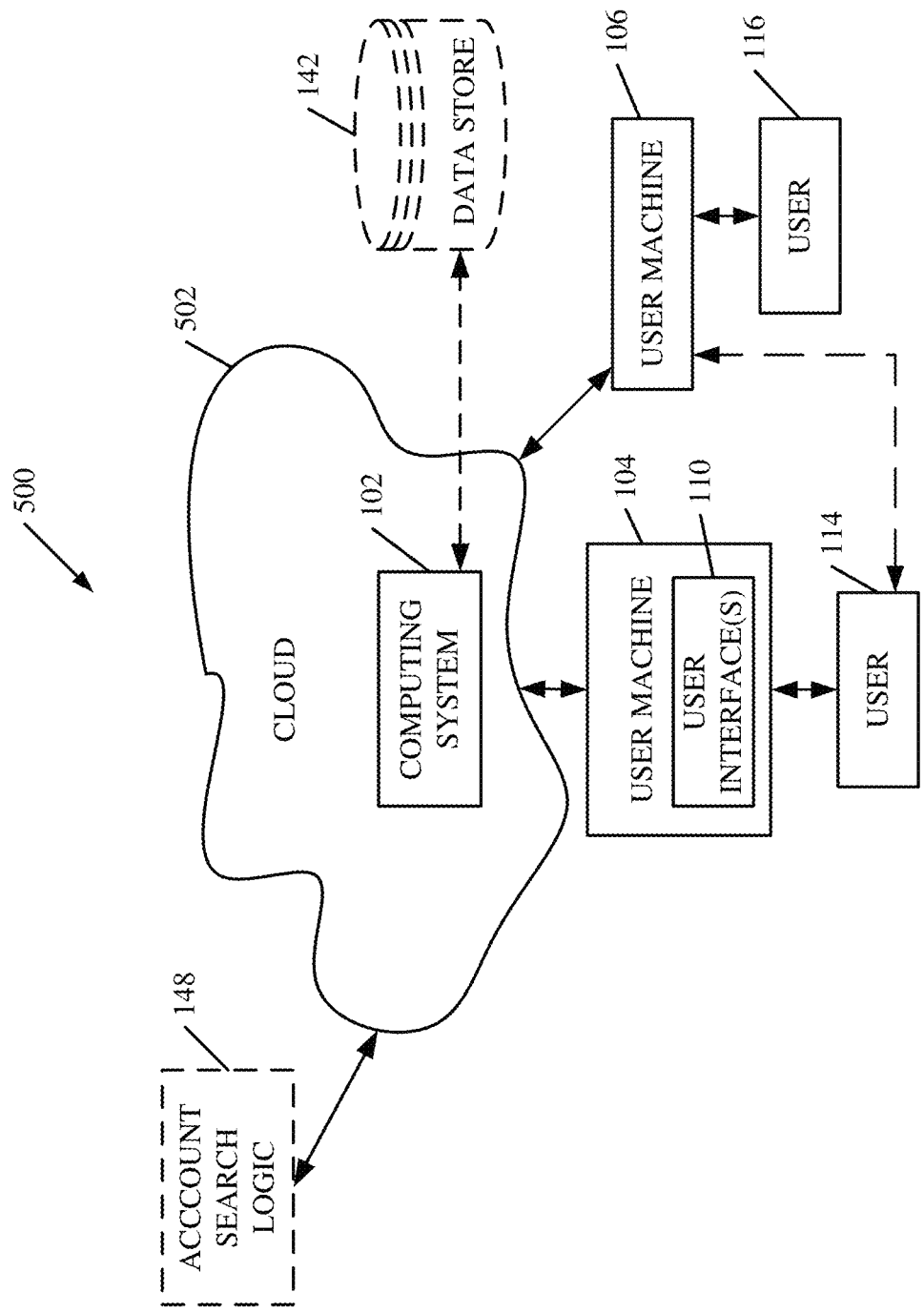
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, user(s) 114, 116 use user machines 104, 106 to access those systems through cloud 502.

FIG. 5 also depicts another example of a cloud architecture. FIG. 5 shows that it is also contemplated that some elements of computing system 102 can be disposed in cloud 502 while others are not. By way of example, data store 142 can be disposed outside of cloud 502, and accessed through cloud 502. In another example, account search logic 140 (or other items) can be outside of cloud 502. Regardless of where they are located, they can be accessed directly by machines 104, 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
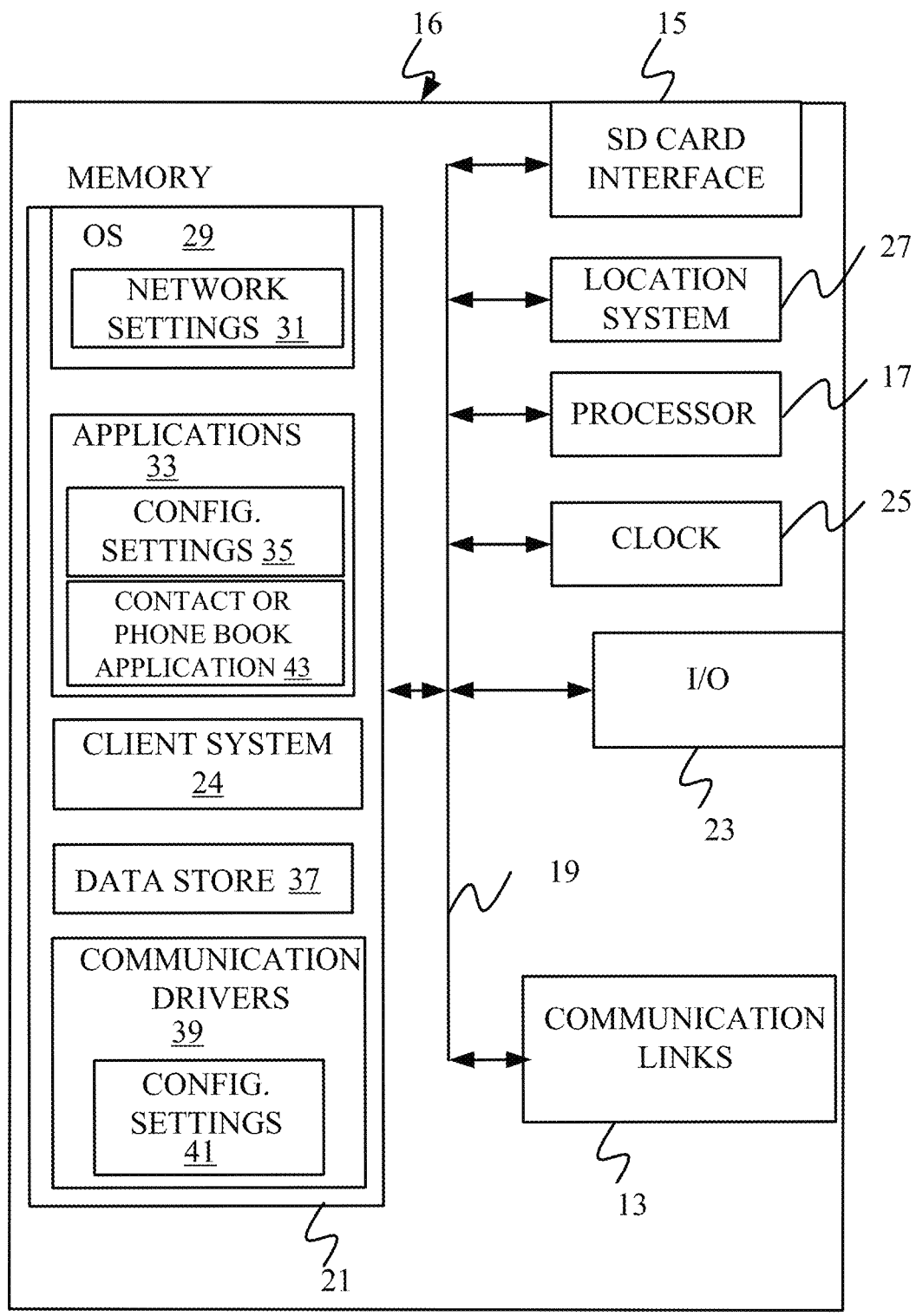
FIGS. 6-8 show examples of mobile devices that can be used in the architectures used in the previous Figures.
Figure 7:
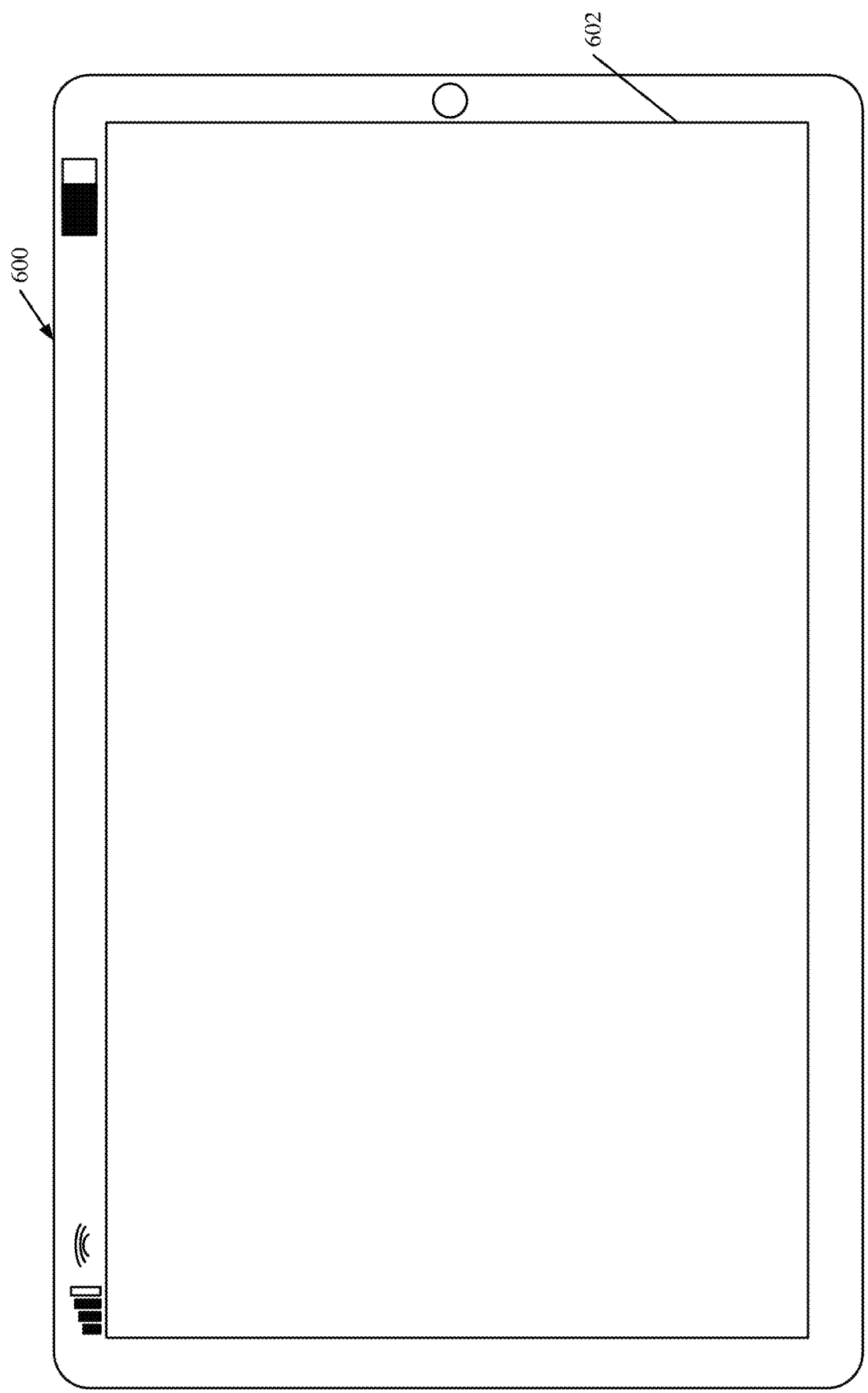
Figure 8:
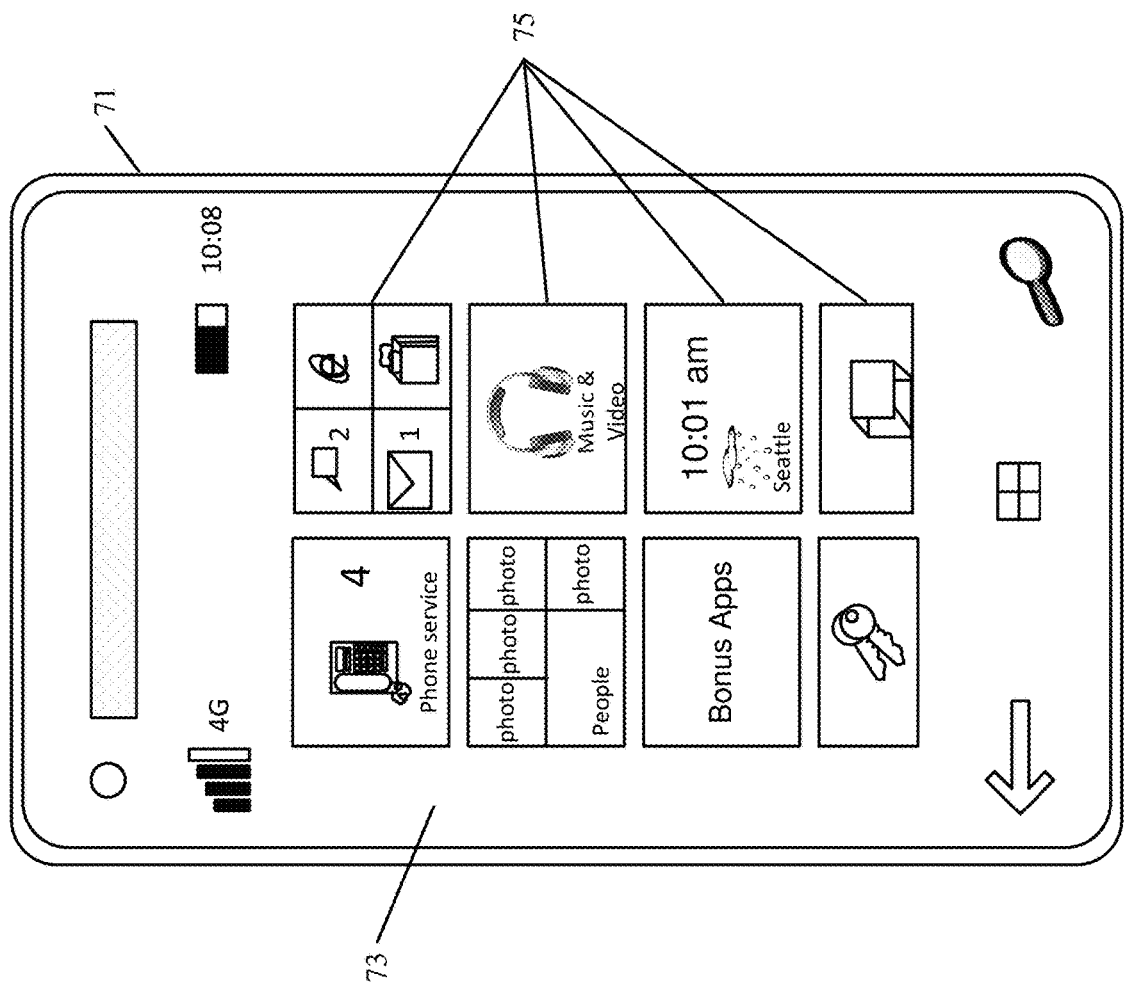

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components computing system 102 or user machines 104, 106 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
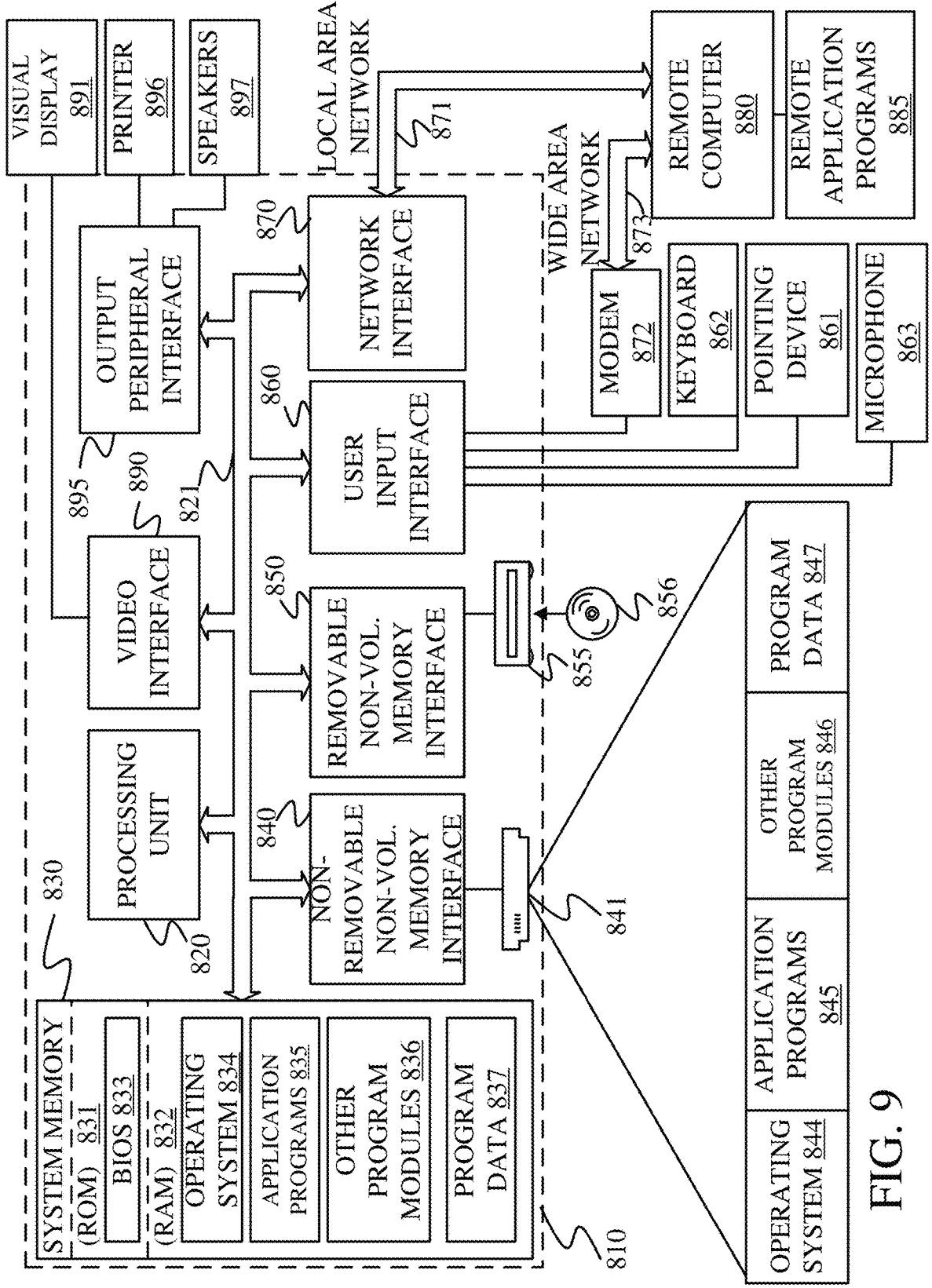
FIG. 9 is a block diagram showing one example of a computing environment that can be used in the architectures shown in the previous Figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

initiation detector logic configured to detect an add account user input to add an electronic mail (email) account to a service;

account settings detection logic configured to detect account configuration information corresponding to a pre-existing email account; and account add logic that configures the email account to be added to the service, based on the detected account configuration information corresponding to the, pre-existing email account.

Example 2 is the computing system of any or all previous examples and further comprising:

pre-existing account search logic configured to search a local user computing system to identify a pre-existing email account corresponding to the user that was configured prior to detecting the add account user input;

Example 3 is the computing system of any or all previous examples and further comprising:

remote search logic configured to request a remote computing system to search a hosted email service on the remote computing system to identify any additional pre-existing email accounts corresponding to the user and to obtain account configuration information corresponding to any additional pre-existing email accounts identified.

Example 4 is the computing system of any or all previous examples and further comprising:

account settings aggregation logic configured to aggregate the configuration information corresponding to the identified, pre-existing email account and any additional pre-existing email account accounts to obtain an aggregated set of pre-existing email accounts and corresponding configuration information.

Example 5 is the computing system of any or all previous examples and further comprising:

account settings prediction logic configured to output a set of predicted configuration information for the account to be added to the service, based on the aggregated set of pre-existing email accounts and corresponding configuration information, the account add logic being configured to configure, on the service, the email account to be added to the service using the set of predicted configuration information.

Example 6 is the computing system of any or all previous examples and further comprising:

account testing logic configured to test the email account added to the service and generate a test output indicative of whether the email account added to the service functions properly.

Example 7 is the computing system of any or all previous examples and further comprising:

information sufficiency determination logic configured to determine whether the aggregated set of pre-existing email accounts and corresponding configuration information is sufficient to configure the email account on the service and, if not, to identify a deficiency in the aggregated set of pre-existing accounts and corresponding configuration information.

Example 8 is the computing system of any or all previous examples and further comprising:

add account UX logic configured to prompt the user for information identified by the deficiency.

Example 9 is the computing system of any or all previous examples wherein the account settings detection logic comprises:

a server information detector configured to detect server information corresponding to the identified, pre-existing email account, the server information including configured to detect a communication protocol used by the pre-existing email account.

Example 10 is the computing system of any or all previous examples wherein the server information detector is configured to detect an address of an incoming server for the pre-existing email account and an outgoing server for the pre-existing email account.

Example 11 is the computing system of any or all previous examples wherein the account settings detection logic comprises:

a user information detector configured to detect user identifying information corresponding to the pre-existing email account.

Example 12 is the computing system of any or all previous examples and further comprising:

an authentication information processing system configured to generate a user interface with a user input mechanism configured to detect user input of authentication information for the email account to be added to the service.

Example 13 is a computer implemented method of adding an electronic mail (email) account to a service, comprising:

detecting an add account user input to add the email account to a service;

corresponding to the user that was configured prior to detecting the add account user input;

detecting account configuration information corresponding to a pre-existing email account corresponding to the user that was configured prior to detecting the add account user input; and configuring, on the service, the email account to be added to the service, based on the detected account configuration information corresponding to the identified, pre-existing email account.

Example 14 is the computer implemented method of any or all previous examples and further comprising:

controlling search logic to search a local user computing system to identify the pre-existing email account;

requesting a remote computing system to search a hosted email service on the remote computing system to identify any additional pre-existing email accounts corresponding to the user; and obtaining account configuration information corresponding to any additional pre-existing email accounts identified.

Example 15 is the computer implemented method of any or all previous examples and further comprising:

aggregating the configuration information corresponding to the identified, pre-existing email account and any additional pre-existing email account accounts to obtain an aggregated set of pre-existing email accounts and corresponding configuration information; and generating a set of predicted configuration information for the account to be added to the service, based on the aggregated set of pre-existing email accounts and corresponding configuration information, wherein configuring the email account to be added to the service comprises configuring, on the service, the email account to be added to the service using the set of predicted configuration information.

Example 16 is the computer implemented method of any or all previous examples and further comprising:

testing the email account added to the service; and generating a test output indicative of whether the email account added to the service functions properly;

if the email account added to the service does not function properly, then generating a user interface prompting the user to input configuration information; and configuring the email account to be added to the service based on the configuration information input by the user.

Example 17 is the computer implemented method of any or all previous examples and further comprising:

determining whether the aggregated set of pre-existing email accounts and corresponding configuration information is sufficient to configure the email account on the service;

if not, identifying a deficiency in the aggregated set of pre-existing accounts and corresponding configuration information;

prompting the user to input configuration information identified by the deficiency; and configuring the email account to be added to the service based on the configuration information input by the user.

Example 18 is the computer implemented method of any or all previous examples wherein detecting account configuration information comprises:

detecting a communication protocol used by the pre-existing email account; and detecting an address of an incoming server for the pre-existing email account and an outgoing server for the pre-existing email account.

Example 19 is a computing system, comprising:

initiation detector logic configured to detect an add account user input to add an electronic mail (email) account to a service;

pre-existing account search logic configured to search a local user computing system to identify a pre-existing email account corresponding to the user that was configured prior to detecting the add account user input;

account settings detection logic configured to detect account configuration information corresponding to the identified, pre-existing email account;

remote search logic configured to request a remote computing system to search a hosted email service on the remote computing system to identify any additional pre-existing email accounts corresponding to the user and to obtain account configuration information corresponding to any additional pre-existing email accounts identified;

account settings aggregation logic configured to aggregate the configuration information corresponding to the identified, pre-existing email account and any additional pre-existing email account accounts to obtain an aggregated set of pre-existing email accounts and corresponding configuration information; and account add logic that configures the email account to be added to the service, based on the aggregated set of pre-existing email accounts and corresponding configuration information.

Example 20 is the computing system of any or all previous examples and further comprising:

account settings prediction logic configured to output a set of predicted configuration information for the account to be added to the service, based on the aggregated set of pre-existing email accounts and corresponding configuration information, the account add logic being configured to configure, on the service, the email account to be added to the service using the set of predicted configuration information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
   detect an add account user input to add an electronic mail (email) account, corresponding to a user, to an email service;
   identify a pre-existing email account that corresponds to the user and includes email account configuration information that was configured prior to detection of the add account user input;
   automatically configure the email account, to be added to the email service, based on the email account configuration information corresponding to the pre-existing email account.

2. The computing system of claim 1 wherein the email service comprises an email client, and the instructions cause the computing system to:
   search a local user computing system to identify the pre-existing email account corresponding to the user that was configured prior to detecting the add account user input.

3. The computing system of claim 1 wherein the instructions cause the computing system to:
   request a remote computing system to search a hosted email service on the remote computing system to identify any additional pre-existing email accounts corresponding to the user and to obtain account configuration information corresponding to any additional pre-existing email accounts identified.

4. The computing system of claim 3 wherein the instructions cause the computing system to:
   aggregate the configuration information corresponding to the identified, pre-existing email account and any additional pre-existing email accounts to obtain an aggregated set of pre-existing email accounts and corresponding configuration information.

5. The computing system of claim 4 wherein the instructions cause the computing system to:
   output a set of predicted configuration information for the account to be added to the computing service, based on the aggregated set of pre-existing email accounts and corresponding configuration information; and
   configure, on the computing service, the email account to be added to the computing service using the set of predicted configuration information.

6. The computing system of claim 4 wherein the instructions cause the computing system to:
   detect server information corresponding to the identified, pre-existing email account, the server information including configured to detect a communication protocol used by the pre-existing email account.

7. The computing system of claim 6 wherein the instructions cause the computing system to detect an address of an incoming server for the pre-existing email account and an outgoing server for the pre-existing email account.

8. The computing system of claim 1 wherein the computing service comprises a hosted email service, and the instructions cause the computing system to:
   detect user identifying information corresponding to the pre-existing email account.

9. The computing system of claim 1 wherein the instructions cause the computing system to:

generate a user interface with a user input mechanism configured to detect user input of authentication information for the email account to be added to the computing service.

10. The computing system of claim 1 wherein the instructions cause the computing system to:
test the email account added to the computing service and generate a test output indicative of whether the email account added to the computing service functions properly.

11. The computing system of claim 10 wherein the instructions cause the computing system to:
determine whether the aggregated set of pre-existing email accounts and corresponding configuration information is sufficient to configure the email account on the computing service and, if not, to identify a deficiency in the aggregated set of pre-existing accounts and corresponding configuration information.

12. The computing system of claim 11 wherein the instructions cause the computing system to:
prompt the user for information identified by the deficiency.

13. A method performed by a computing system, the method comprising:
detecting an add account user input to add an electronic mail (email) account, corresponding to a user, to a computing service;
identifying a plurality of different email accounts that each correspond to the user and include email account configuration information that was configured prior to detection of the add account user;
aggregating the email account configuration information corresponding to the plurality of different email accounts to obtain an aggregated set of pre-existing email accounts and corresponding configuration information;
determining whether the aggregated set of pre-existing email accounts and corresponding configuration information is sufficient to configure the email account on the email service with a set of predicted configuration information;
based on the determination, identifying a deficiency in the aggregated set of pre-existing email accounts and corresponding configuration information;
prompting the user to input configuration information corresponding to the deficiency; and
configuring, on the computing service, the email account based on the set of predicted configuration information and the configuration information input by the user.

14. The method of claim 13 and further comprising:
controlling search logic to search a local user computing system to identify the pre-existing email account;
requesting a remote computing system to search a hosted email service on the remote computing system to identify any additional pre-existing email accounts corresponding to the user; and
obtaining account configuration information corresponding to any additional pre-existing email accounts identified.

15. The method of claim 13, wherein the plurality of different email accounts are identified regardless of a particular user machine from which they were added.

16. The method of claim 13 and further comprising:
testing the email account added to the computing service; and
generating a test output indicative of whether the email account added to the computing service functions properly;
if the email account added to the computing service does not function properly, then generating a user interface prompting the user to input second configuration information; and
configuring the email account to be added to the computing service based on the second configuration information input by the user.

17. The method of claim 13, wherein prompting the user comprises:
generating a user interface display with prefilled fields configured to receive manual user inputs that provide information corresponding to configuration of the email account to be added to the computing system.

18. The method of claim 13 wherein the computing service comprises an email client to which the email account is added, and the email account configuration information comprises:
a communication protocol used by a pre-existing email account;
an address of an incoming server for a pre-existing email account; and
an outgoing server for a pre-existing email account.

19. A computing system, comprising:
at least one processor; and
memory storing instructions executable by the at least one processor, wherein the instructions, when executed, provide:
initiation detector logic configured to detect an add account user input from a user to add an electronic mail (email) account to a service;
pre-existing account search logic configured to search a local user computing system, that is local to the user, to identify a first pre-existing email account corresponding to the user that was configured prior to detecting the add account user input;
account settings detection logic configured to detect first email account configuration information corresponding to the first pre-existing email account;
remote search logic configured to request a remote computing system, that is remote from the user, to search a hosted email service on the remote computing system to identify a second pre-existing email account corresponding to the user and to obtain second email account configuration information corresponding to the second pre-existing email account;
account settings aggregation logic configured to aggregate the first and second email configuration information corresponding to the first and second pre-existing email accounts to obtain an aggregated set of pre-existing email accounts and corresponding configuration information; and
account add logic that configures the email account to be added to the service, based on the aggregated set of pre-existing email accounts and corresponding configuration information.

20. The computing system of claim 19 wherein the instructions, when executed, provide:
account settings prediction logic configured to output a set of predicted configuration information for the account to be added to the service, based on the aggregated set of pre-existing email accounts and corresponding configuration information, the account add logic being configured to configure, on the service, the email account to be added to the service using the set of predicted configuration information.

* * * * *